US012774582B1

(12) United States Patent
Kotlaba

(10) Patent No.: US 12,774,582 B1
(45) Date of Patent: Oct. 27, 2026

(54) PROPORTIONAL PRESSURE CONTROL SYSTEM FOR AUTONOMOUS CONTROL OF EARTH-MOVING CONSTRUCTION AND/OR MINING VEHICLES

(71) Applicant: AIM Intelligent Machines, Inc., Monroe, WA (US)

(72) Inventor: Robert Kotlaba, Most (CZ)

(73) Assignee: AIM Intelligent Machines, Inc., Redmond, WA (US)

( * ) Notice: Subject to any disclaimer, the term of this patent is extended or adjusted under 35 U.S.C. 154(b) by 293 days.

(21) Appl. No.: 18/125,531

(22) Filed: Mar. 23, 2023

Related U.S. Application Data

(60) Provisional application No. 63/354,677, filed on Jun. 22, 2022.

(51) Int. Cl.
*E02F 9/20* (2006.01)
*E02F 9/12* (2006.01)
(Continued)

(52) U.S. Cl.
CPC ............ *E02F 9/205* (2013.01); *E02F 9/2004* (2013.01); *E02F 9/2203* (2013.01);
(Continued)

(58) Field of Classification Search
CPC ....... E02F 9/205; E02F 9/2004; E02F 9/2203; E02F 9/2228; E02F 9/2285; E02F 9/123; E02F 9/00; F15B 15/20; F15B 21/001; F15B 2211/526; F15B 15/00; F15B 21/00; F15B 2211/00
See application file for complete search history.

(56) References Cited

U.S. PATENT DOCUMENTS 11,375,041 B2 6/2022 Theverapperuma et al.
11,494,930 B2 11/2022 Theverapperuma et al.
(Continued)

FOREIGN PATENT DOCUMENTS

CN 115205395 A 10/2022
EP 4083335 A2 8/2022
(Continued)

OTHER PUBLICATIONS

Merriam-Webster, "manifold", May 29, 2022, p. 1 (Year: 2022).*
(Continued)

*Primary Examiner* — Aniss Chad
*Assistant Examiner* — Elizabeth J Slowik
(74) *Attorney, Agent, or Firm* — VLP Law Group LLP; James A. D. White

(57) ABSTRACT

Systems and techniques are described for proportional pressure control of earth-moving construction and/or mining vehicles. For example, the systems and techniques may perceive positions of one or more components, such as a first joystick, a second joystick, a first pedal, a second pedal, and a button, feed the positions of the first joystick, the second joystick, the first pedal, the second pedal, and the button to a vehicle control system, receive a set of movement instructions from the vehicle control system, and effect the proportional opening and closing of the valves of the low-pressure, electronically controlled hydraulic manifold based on the set of movement instructions.

20 Claims, 28 Drawing Sheets

(51) Int. Cl.
*E02F 9/22* (2006.01)
*F15B 15/20* (2006.01)
*F15B 21/00* (2006.01)

(52) U.S. Cl.
CPC .......... *E02F 9/2228* (2013.01); *E02F 9/2285* (2013.01); *F15B 15/20* (2013.01); *F15B 21/001* (2013.01); *E02F 9/123* (2013.01); *F15B 2211/526* (2013.01)

(56) References Cited

U.S. PATENT DOCUMENTS

| | | | | |
|---|---|---|---|---|
| 11,560,690 | B2 | 1/2023 | Halder et al. | |
| 11,567,197 | B2 | 1/2023 | Halder | |
| 11,619,027 | B1 * | 4/2023 | Bradley | E02F 3/3654 60/422 |
| 2008/0234907 | A1 * | 9/2008 | Labuhn | B60T 7/042 701/70 |
| 2016/0076228 | A1 * | 3/2016 | Nau | E02F 3/842 701/50 |
| 2016/0146227 | A1 * | 5/2016 | Hoshaku | F15B 13/044 60/428 |
| 2019/0146510 | A1 * | 5/2019 | Akhtar | G05D 1/0055 701/26 |
| 2020/0080574 | A1 * | 3/2020 | Slightam | F15B 11/20 |
| 2020/0111169 | A1 | 4/2020 | Halder et al. | |
| 2020/0150650 | A1 | 5/2020 | Jarlengrip | |
| 2020/0150687 | A1 | 5/2020 | Halder et al. | |
| 2020/0183392 | A1 * | 6/2020 | Bardos | H01R 13/6625 |
| 2020/0310442 | A1 | 10/2020 | Halder et al. | |
| 2021/0017738 | A1 | 1/2021 | Sano | |
| 2021/0254308 | A1 | 8/2021 | Thibblin et al. | |
| 2021/0317633 | A1 | 10/2021 | Sherlock | |
| 2021/0341033 | A1 * | 11/2021 | Breutzman | G05G 5/02 |
| 2022/0024485 | A1 | 1/2022 | Theverapperuma et al. | |
| 2022/0026921 | A1 | 1/2022 | Halder | |
| 2022/0042286 | A1 | 2/2022 | Tsuji et al. | |
| 2022/0042525 | A1 * | 2/2022 | Moley | F16K 17/105 |
| 2022/0057513 | A1 | 2/2022 | Pihl | |
| 2022/0074168 | A1 * | 3/2022 | Yamada | E02F 9/123 |
| 2022/0154431 | A1 | 5/2022 | Kurosawa | |
| 2022/0340171 | A1 | 10/2022 | Halder | |
| 2023/0010121 | A1 * | 1/2023 | Nytko | F15B 15/202 |
| 2023/0088608 | A1 * | 3/2023 | Matsuhashi | E02F 9/205 701/1 |
| 2023/0093196 | A1 * | 3/2023 | Fukukawa | B60W 30/143 701/93 |
| 2024/0279902 | A1 * | 8/2024 | Hashimoto | E02F 9/261 |
| 2025/0003190 | A1 * | 1/2025 | Song | E02F 9/205 |

FOREIGN PATENT DOCUMENTS

| | | | |
|---|---|---|---|
| KR | 10-2022-0014477 | | 12/2022 |
| WO | 2018099755 | A1 | 6/2018 |
| WO | 2022198331 | A1 | 9/2022 |

OTHER PUBLICATIONS

HydraForce, "Electrohydraulic Control Solutions for Excavators", 2020 (Year: 2020).*

Clippard, "Manifold 15482-8", Feb. 14, 2022 (Year: 2022).*

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.

Digi XBee SX 868 Datasheet, retrieved on Aug. 22, 2022 from www.digi.com/resources/library/data-sheets/ds_xbee-sx-868, 2 pages.

ST LM217/LM317 Datasheet, Dec. 2021, retrieved on Aug. 22, 2022 from www.st.com/resource/en/datasheet/lm317.pdf, 34 pages.

ST LD1117 Datasheet, Feb. 2020, retrieved on Aug. 22, 2022 from www.st.com/resource/en/datasheet/ld1117.pdf, 46 pages.

Texas Instruments TCAN33x 3.3-V CAN Transceivers With CAN FD, Dec. 2019, retrieved on Aug. 22, 2022 from www.ti.com/lit/gpn/TCAN334, 45 pages.

PJRC Teensy 4.1 Development Board, retrieved on Mar. 18, 2022 from www.pjrc.com/store/teensy41.html, 22 pages.

Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.

NXP Semiconductors i.MX RT1060 Crossover MCU with Arm® Cortex®—M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.

Livox LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.

Inductive Proximity Sensor LJ12A3-4-Z/BX, retrieved on Aug. 22, 2022 from datasheetspdf.com/pdf-file/1096182/ETT/LJ12A3-4-Z/1, 1 page.

Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.

Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.

Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.

TRL Off-Highway Automated Vehicles Code of Practice, 2021, retrieved on Aug. 22, 2022 from trl.co.uk/uploads/trl/documents/PPR994-Off-Highway-AV-CoP_v3.pdf, 40 pages.

Steve Crowe, "John Deere Acquiring Bear Flag Robotics for $250M", Aug. 5, 2021, retrieved on Jun. 20, 2022 from www.therobotreport.com/john-deere-acquiring-bear-flag-robotics-250m/, 11 pages.

Steve Crowe, "Oxbotica Pilots Safety Framework for Off-Road Autonomous Driving", Jun. 7, 2021, retrieved on Jun. 20, 2022 from www.therobotreport.com/oxbotica-pilots-safety-framework-off-road-autonomous-driving/, 11 pages.

Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.

Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.

Greg Nichols, "Off Road: Autonomous Driving's New Frontier Requires a New Kind of Sensor", Apr. 14, 2021, retrieved on Jun. 20, 2022 from www.zdnet.com/article/off-road-autonomous-drivings-new-frontier-requires-a-new-kind-of-sensor/, 15 pages.

Tagolas Magma X2 Datasheet, retrieved on Aug. 22, 2022 from www.taoglas.com/datasheets/AA.175.301111.pdf, 20 pages.

LIVOX Mid-40/Mid-100 LiDAR Specs, retrieved on Aug. 22, 2022 from https://www.livoxtech.com/mid-40-and-mid-100/specs, 2 pages.

Elaine Ball, "Top Benefits of Using LiDAR for Construction Projects", Oct. 1, 2020, retrieved from https://csengineermag.com/top-benefits-of-using-lidar-for-construction-projects/ on Nov. 4, 2022, 4 pages.

"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.

Peter Brown, "LiDAR Improves Efficiency and Safety In Industrial Heavy Equipment", Oct. 22, 2021, retrieved from https://electronics360.

(56) References Cited

OTHER PUBLICATIONS globalspec.com/article/17336/lidar-improves-efficiency-and-safety-in-industrial-heavy-equipment on Nov. 4, 2022, 2 pages.
"Construction Remains Ahead In Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.
"LiDAR for Heavy Machinery", retrieved from https://innoviz.tech/applications/industrial on Nov. 4, 2022, 2 pages.
"Hitachi Construction Machinery Invests in Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.
Nakagawa et al., "Real-Time Mapping of Construction Workers Using Multilayered LiDAR", The 40th Asian Conference on Remote Sensing 2019, Oct. 14-18, 2019, 8 pages.
Sabbir Rangwala, "LiDAR Vision—Helping Bring Autonomous Trucks to Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.
"Collision Warning on the Rear of an Excavator With 3D LiDAR Sensors", retrieved from https://www.sick.com/ca/en/industries/mobile-automation/construction-and-mining-machines/excavator/collision-warning-on-the-rear-of-an-excavator-with-3d-lidar-sensors/c/p549945 on Nov. 4, 2022, 1 page.
"Autonomous Construction Vehicles", retrieved from https://www.technologycards.net/english/the-technologies/autonomous-construction-vehicles on Nov. 4, 2022, 2 pages.

* cited by examiner

PROPORTIONAL PRESSURE CONTROL SYSTEM FOR AUTONOMOUS CONTROL OF EARTH-MOVING CONSTRUCTION AND/OR MINING VEHICLES

TECHNICAL FIELD

The following disclosure relates generally to systems and techniques for proportional pressure control systems for use with autonomous control of operations of earth-moving construction and/or mining vehicles.

BACKGROUND

Earth-moving construction and mining vehicles may be used on a job site to move soil and other materials (e.g., gravel, rocks, asphalt, etc.) and to perform other operations, and are each typically operated by a human operator (e.g., a human user present inside a cabin of the vehicle, a human user at a location separate from the vehicle but performing interactive remote control of the vehicle, etc.).

The human operator controls the movement of the various components of an earth-moving vehicle using joysticks and pedals attached to the different components. These joysticks and pedals are connected using a pilot control to a main hydraulic manifold that allows hydraulic pressure to pass through various connections and control the operation of the components. As the joysticks and pedals are moved to different positions, the pilot control opens up different valves and allows the high-pressure excavator control from the main hydraulic manifold to operate different components of the earth-moving vehicle, such as boom or bucket.

Limited autonomous operations (e.g., performed under automated programmatic control without human user interaction or intervention) of some earth-moving vehicles have occasionally been used, but existing techniques suffer from a number of problems, including the use of limited types of sensed data, an inability to perform fully autonomous operations when faced with on-site obstacles, an inability to coordinate autonomous operations between multiple on-site earth-moving vehicles, requirements for bulky and expensive hardware systems to support the limited autonomous operations, etc.

DETAILED DESCRIPTION

Figure 1:
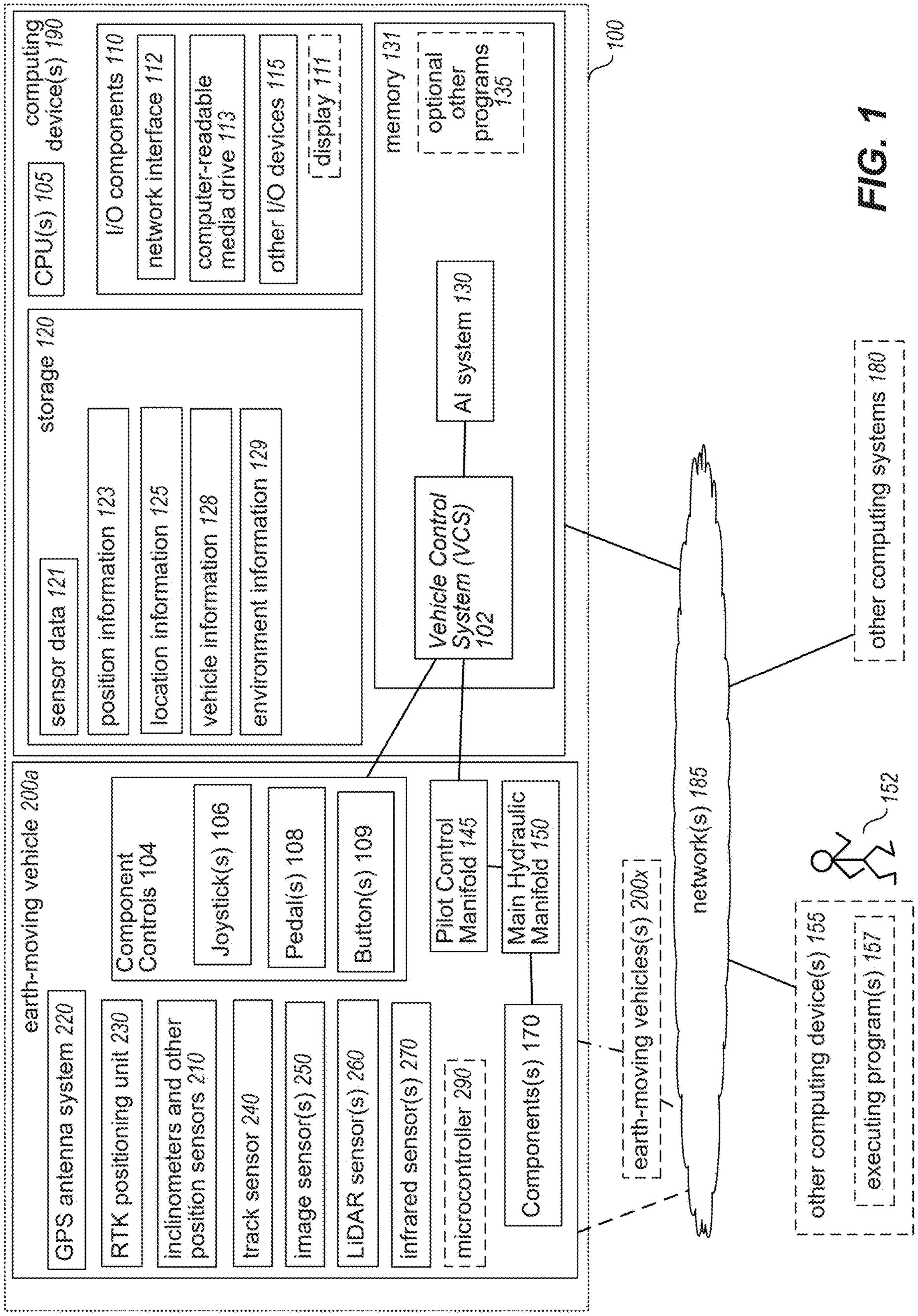
FIG. 1 is a network diagram illustrating an example embodiment of using described systems and techniques for a proportional pressure control system of one or more earth-moving construction and/or mining vehicles on a site.

Systems and techniques are described for implementing proportional pressure control systems for use with autonomous control of operations of earth-moving construction and/or mining vehicles, such as for one or more excavator vehicles on a site (e.g., as part of automatically determining and controlling movement of an excavator vehicle's boom/arm and attachment to move materials or perform other actions). In at least some embodiments, the described systems and techniques are used to perceive positions of one or more joysticks and pedals of the earth-moving construction and/or mining vehicle, and to effect proportional opening and/or closing of valves of a low-pressure, electronically controlled pilot control hydraulic manifold to implement fully autonomous operations of one or more earth-moving construction and/or mining vehicles in accordance with one or more defined movement instructions and/or tasks (e.g., dig a hole of a specified size and/or shape and/or at a specified location, move one or more rocks from a specified area, etc.) and/or other goals, including in at least some embodiments and situations to do so when faced with possible on-site obstacles (e.g., man-made structures, rocks and other naturally occurring impediments, other equipment, people or animals, etc.) and/or to implement coordinated actions of multiple such earth-moving construction and/or mining vehicles (e.g., multiple excavator vehicles, an excavator vehicle and one or more other earth-moving vehicles of one or more other types, etc.). As one non-exclusive example, the described systems and techniques may in some embodiments further a hardware component architecture with sensors of multiple types positioned at various points on an earth-moving construction and/or mining vehicle (e.g., an excavator vehicle) at a site, and one or more hardware controllers (e.g., microcontrollers) used to obtain and analyze the sensor data for use in determining movement instructions of one or more such vehicles that can then be used to effect the proportional opening and/or closing of the valves of the low-pressure electronically controlled hydraulic manifold. Additional details related to the techniques for implementing proportional pressure control systems, the hardware component architecture and to related techniques for implementing autonomous control of earth-moving construction and/or mining vehicles in particular manners are described below, and in other embodiments some or all of the described techniques are performed by a vehicle control system (VCS) to control one or more earth-moving construction and/or mining vehicles of one or more types (e.g., a VCS operating on at least one of one or more excavator vehicles being controlled), optionally in conjunction with a higher-level artificial intelligence (AI) system that generates work plans and performs other operations as described herein.

In at least some embodiments, data may be obtained and used by the VCS from sensors of multiple types positioned on or near an earth-moving construction and/or mining vehicle, such as one or more of GPS location data, track and cabin heading data, visual data of captured image(s), depth data from LiDAR and/or other depth-sensing and proximity devices, infrared data, real-time kinematic positioning information based on GPS data and/or other positioning data, inclinometer data for particular moveable parts of a construction and/or mining vehicle (e.g., the digging boom/arm/attachment of an excavator vehicle), etc. As one non-exclusive example, the described systems and techniques may in some embodiments include obtaining and integrating data from sensors of multiple types positioned on an earth-moving construction and/or mining vehicle at a site, and using the data to determine and control operations of the vehicle to accomplish one or more defined tasks at the site, including determining current location and positioning of the vehicle on the site, identifying and classifying obstacles (if any) involved in accomplishing the task(s), and determining and implementing actions to control movement of some or all of the vehicle to move materials or perform other actions for the one or more tasks (including to address any such obstacles as part of doing so). Such earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of construction and/or mining vehicles. With respect to sensor types, one or more types of GPS antennas and associated components may be used to determine and provide GPS data or other location data in at least some embodiments. In addition, one or more types of LiDAR devices may be used in at least some embodiments to determine and provide depth data about an environment around an excavator vehicle or other earth-moving vehicle (e.g., to determine a 3D, or three-dimensional, model of some or all of a job site on which the vehicle is situated) and with corresponding data optionally stored in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments. Moreover, real-time kinematic positioning information may be determined from a combination of GPS data and other positioning data, such as in combination with an inertial navigation system, and/or a radio that receives RTK correction data. Other hardware components that may be positioned on or near an earth-moving vehicle and used to provide data and/or functionality used by the VCS include the following: one or more inclinometers (e.g., single axis and/or double axis) or other accelerometers; a CAN bus message transceiver; one or more low-power microcontrollers, such as to execute and use executable software instructions and associated data of the VCS; one or more voltage converters and/or regulators; a voltage level shifter; etc. In addition, in at least some embodiments and situations, one or more types of data from one or more sensors positioned on an earth-moving vehicle may be combined with one or more types of data (whether the same types of data and/or other types of data) acquired from one or more positions remote from the vehicle (e.g., from an overhead location, such as from a drone aircraft, an airplane, a satellite, etc.; elsewhere on a site on which the vehicle is located, such as at a fixed location and/or on another earth-moving vehicle of the same type or a different type; etc.), with the combination of data used in one or more types of autonomous operations as discussed herein. Additional details are included below regarding positioning of multiple types of data sensors and use of corresponding data, including with respect to the examples of FIGS. 2A-2I.

As is also noted above, automated operations of an earth-moving vehicle by the VCS may include determining current location and other positioning of an earth-moving vehicle on a site in at least some embodiments. As one non-exclusive example, such position determination may include using one or more track sensors (or wheel sensors in other embodiments) to monitor whether or not the earth-moving vehicle's tracks (or wheels) are aligned in the same direction as the cabin, and using GPS data (e.g., in one example, from three or more GPS antennas located on an excavator cabin, such as in a manner similar to that described with respect to FIG. 2B) in conjunction with an inertial navigation system to determine the rotation of the cabin chassis (e.g., relative to true north), as well as to determine an absolute location of the vehicle's body and/or other parts. When using data from multiple GPS antennas, the data may be integrated in various manners, such as by using a microcontroller located on the excavator vehicle and/or with additional RTK (real-time kinematic) positioning data used to provide an RTK-enabled GPS positioning unit that reinforces and provides further precision with respect to the GPS-based location (e.g., to achieve 1-inch precision or better). In addition, in some embodiments and situations, LiDAR data is used to assist in position determination operations, such as by surveying the surroundings of the earth-moving vehicle (e.g., an entire job site on which the vehicle is located) and confirming a current location of the vehicle (e.g., relative to a three-dimensional, or 3D, map of the job site generated from the LiDAR data). Additional details are included below regarding such automated operations to determine current location and other positioning of an earth-moving vehicle on a site.

In addition, automated operations using a VCS may further include receiving instructions from an AI system determining actions or movement commands to control movement of some or all of an earth-moving vehicle (e.g., an excavator vehicle's boom/arm and attachment) to move materials or perform other actions for the one or more tasks on a job site or other geographical area. In addition, the autonomous operations of the earth-moving vehicle to perform one or more tasks may be initiated in various manners, such as by an operator component of the AI system. In other embodiments, determination of one or more target tasks or movement instructions to perform and initiation of corresponding earth-moving vehicle activities may be performed in other manners, such as in part or in whole based on input received from one or more human users or other sources.

The activities of this non-exclusive embodiment may further be implemented by a system comprising one or more hardware processors; a plurality of sensors mounted on an earth-moving vehicle (e.g., an excavator vehicle) to obtain vehicle data about the vehicle, including a real-time kinematic (RTK)-enabled positioning unit using GPS data from one or more GPS antennas on the cabin of the earth-moving vehicle, and one or more inclinometers; a plurality of additional sensors to obtain environment data about an environment surrounding the vehicle, including at least one of one or more LiDAR sensors, or one or more image capture devices; and one or more storage devices having software instructions that, when executed by at least one processor of the one or more hardware processors, cause the at least one processor to perform automated operations to implement any or all of the activities described above, and optionally further comprising the vehicle itself. The activities of this non-exclusive embodiment may further include be implemented using stored contents on a non-transitory computer-readable medium that cause one or more computing devices to perform automated operations to implement any or all of the activities described above.

In addition, while the autonomous operations of an earth-moving vehicle controlled by the VCS may in some embodiments be fully autonomous and performed without any input or intervention of any human users using the VCS system, in other embodiments the autonomous operations of an earth-moving vehicle controlled by the VCS system may include providing information to one or more human users about the operations of the VCS system and optionally receiving information from one or more such human users (whether on-site or remote from the site) that are used as part of the automated operations of the AI system (e.g., one or more target tasks, a high-level work plan, etc.), such as via one or more GUIs ("graphical user interfaces") displayed on one or more computing device that provide user-selectable controls and other options to allow a user to interactively request or specify types of information to display and/or to interactively provide information for use by the VCS system.

For illustrative purposes, some embodiments are described below in which specific types of data are acquired and used for specific types of automated operations performed for specific types of earth-moving vehicles, and in which specific types of autonomous operation activities are performed in particular manners. However, it will be understood that such described systems and techniques may be used with other types of data and vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to an excavator vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts FIG. 1 is a diagram illustrating an example embodiment of earth-moving vehicle control system 100 with a Vehicle Control System ("VCS") 102 that may be used to implement at least some of the described systems and techniques for implementing autonomous control of earth-moving vehicles, such as to automatically determine and control movement of an earth-moving vehicle's boom/arm and attachment (e.g., digging bucket) to move materials or perform other actions in accordance with specified tasks. The VCS 102 may be implemented on one or more network-accessible configured computing devices 190, whether integrated in the system 100 with a particular earth-moving vehicle 200*a* (e.g., such as located on that vehicle) or with multiple earth-moving vehicles 200 (e.g., that include earth-moving vehicle 200*a* and one or more other earth-moving vehicles 200*x*, and optionally operating in a distributed manner on the multiple vehicles, such as one computing device 190 on each of the multiple vehicles that are interacting in a peer-to-peer manner), or instead remote from one or more such excavator vehicles 200 (e.g., in communication with one or more such vehicles over one or more networks 185). In some embodiments, one or more other computing devices or systems may further interact with the VCS 102 (e.g., to obtain and/or provide information), such as one or more other computing devices 155 each having one or more associated users 152, and/or one or more other computing systems 180 (e.g., to store and provide data, to provide supplemental computing capabilities, etc.). The one or more computing devices 190 may include any computing device or system that may receive data and/or requests, and take corresponding actions (e.g., store the data, respond to the request, etc.) as discussed herein.

In this example, the earth-moving vehicle 200*a* includes a variety of sensors to obtain and determine information about the earth-moving vehicle 200*a* and its surrounding environment (e.g., a job site on which the vehicle is located), including one or more GPS antenna systems 220, an RTK-enabled GPS positioning unit 230 that receives GPS signals from the GPS antenna systems 220 and RTK-based correction data from a remote base station (not shown) and optionally other data from one or more other sensors and/or devices (e.g., an inertial navigation system, not shown), one or more inclinometers and/or other position sensors 210, one or more track sensors 240, one or more image sensors 250 (e.g., part of one or more cameras or other image capture devices), one or more LiDAR emitters and/or sensors 260, one or more infrared sensors 270, one or more material analysis sensor(s) (not shown) (e.g., ground-penetrating radar, spectral analyzers, magnetic field detectors, image-based analyzers, etc.), one or more microcontrollers or other hardware CPUs 290, etc.

The VCS 102 obtains some or all of the data from the sensors on the earth-moving vehicle 200*a*, stores the data in corresponding databases or other data storage formats on storage 120 (e.g., sensor data 121, position information 123, location information 125, vehicle information 128, environment information 129, etc.), and uses the data to perform automated operations involving controlling autonomous operations of the earth-moving vehicle 200*a*, such as in conjunction with an AI system 130. During operation, the VCS 102 may generate or otherwise obtain various types of additional data and optionally store that additional data on storage 120 or elsewhere, such as current location and/or positioning information for a vehicle or vehicle components (e.g., as part of vehicle information 128), a destination location, one or more determined routes, obstacle classification data, etc. As part of its operations, the VCS 102 may analyze and combine the various types of data it receives (e.g., sensor data of multiple types), such as to perform sensor fusion activities. Additional details related to the operation of the VCS 102 are included elsewhere herein.

In this example embodiment, the one or more computing devices 190 include a copy of the VCS 102 stored in memory 131 and being executed by one or more hardware CPUs 105, and the memory 131 may further include one or more optional other executing software programs 135—software instructions of the VCS 102 may further be stored on storage 120 (e.g., for loading into memory 131 at a time of execution), but are not illustrated here. The computing device(s) 190 and the VCS 102 may be implemented using a plurality of hardware components that form electronic circuits suitable for and configured to, when in combined operation, perform at least some of the techniques described herein. In the illustrated embodiment, each computing device 190 includes the one or more hardware CPUs (e.g., microprocessors) 105, storage 120, memory 131, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, etc.), although in other embodiments at least some such I/O components may not be provided (e.g., if the CPU(s) are one or more microcontrollers). The other computing devices 155 and computing systems 180 may include hardware components similar to those of a computing device 190 (and execute software programs, such as illustrated example program(s) 157 on computing device(s) 155), but with those details about hardware components and particular executing software programs being omitted for the sake of brevity. In some embodiments, one or more of the VCS 102 and/or the AI system 130 may be operating on microcontroller computing devices 190 including the components described above.

One or more other earth-moving vehicles 200*x* may similarly be present (e.g., on the same job site as earth-moving vehicle 200*a*) and include some or all such elements 210-290 and/or 104-170 (although not illustrated here for the sake of brevity) and have corresponding autonomous operations controlled by the VCS 102. The network 195 may be of one or more types (e.g., the Internet, one or more cellular telephone networks, etc.) and in some cases may be implemented or replaced by direct wireless communications between two or more devices (e.g., via Bluetooth; LoRa, or Long Range Radio; etc.). In addition, while the example of FIG. 1 includes various types of data gathered for an earth-moving vehicle 200 (e.g., an excavator vehicle) and its surrounding environment, other embodiments may similarly gather and use other types of data, whether instead of or in addition to the illustrated types of data, including non-exclusive examples of image data in one or more light spectrums, non-light energy data, location data of types other than from satellite-based navigation systems, depth or distance data to objects, sound data, etc. In addition, in some embodiments and situations, different devices and/or sensors may be used to acquire the same or overlapping types of data (e.g., simultaneously or sequentially), and the VCS 102 may combine or otherwise use such different types of data (e.g., using sensor fusion techniques), including to determine differential information for a type of data.

As shown in FIG. 1, the system 100 may also include component controls 104. These component controls 104 may be positioned within the cabin of earth-moving vehicle 200 (referred to generally as 200, or individually as 200*a*, 200*x*, etc.) for control of various components 170 of the earth-moving vehicle (such as booms, buckets, claws, tracks, etc.). The component controls 104 may include one or more joystick(s) 106, one or more pedal(s) 108, and/or one or more button(s) 109 that may control movement of the components 170. For example, in one embodiment where the earth-moving vehicle 200*a* is an excavator vehicle, a first joystick 106 may control movement of a first arm joint and a third arm joint of the excavator vehicle and a second joystick 106 may control movement of a second arm joint and a cabin rotation of the excavator vehicle. In the embodiment, a first button 109 mounted on the first joystick 106 may control a movement of a tool of the excavator vehicle. In the embodiment, a first pedal 108 may control a forward and/or backward movement of a right track of the excavator vehicle and a second pedal 108 may control a forward and/or backward movement of a left track of the excavator vehicle. In some implementations, the VCS 102 may receive the various positions of the component controls 104 over time. In further implementations, the VCS 102 may receive electronics signals, such as from the AI system 130 that represent commands determined by the AI system 130. These electronic signals mimic the inputs by an operator using the component controls 104, but are instead determined routes or movements of the earth-moving vehicle 200*a* that are determined by the AI system without any operator input at the component controls 104. In some implementations, the electronic signals can provide a 25% more efficient command as compared to an input by an operator using the component controls 104. In further implementations, a hybrid model is used where an operator provides commands to the component controls 104 and the AI system 130 analyzes those commands in substantially real-time to provide an enhanced command to improve efficiency, such as by removing jerkiness from human movements or ignoring subtle hand motions that do not contribute to a determined routine. In some embodiments, if a user input is detected (e.g., an operator user moves the joystick 106 manually) while the AI system 130 is determining electronic signals that mimic the component controls 104, then autonomous control of the earth-moving vehicle by the VCS 102 may be halted and manual control by the user takes over. In some implementation, the electronic signals are designed to mimic an operator control at a component control 104 and allow the AI system 130 to determine a similar set of movement instructions as if an operator were providing operator controls to the earth-moving vehicles 200.

As shown in FIG. 1, the VCS 102 may communicate with a pilot control manifold 145. The pilot control manifold 145 may be a low-pressure, electronically controlled hydraulic manifold that controls movement of a plurality of valves connected to a main hydraulic manifold 150. The pilot control manifold 145 may use low-pressure to actuate the flow of a higher-pressure main hydraulic manifold 150 and allow for pilot control of the main hydraulic manifold 150. As shown with respect to FIGS. 3A-3H, the pilot control manifold 145 may act as a low-pressure control allowing high-pressure to pass through the various valves of the main hydraulic manifold 150 to operate different components 170 of the earth-moving vehicle 200. The pilot control manifold 145 may include a plurality of valves that are electronically controlled to allow the plurality of valves to proportionally open and/or close to control the main hydraulic manifold 150. The pilot control manifold 145 may be electronically coupled to the VCS 102 for the VCS 102 to send electronic signal as instructions to open/close the various valves of the plurality of valves in the pilot control manifold 145. In some implementations, the instructions sent to the pilot control manifold 145 may include dimension of how much to open a valve and/or a speed in which the valve may be opened in order to dynamically control the speed of movement of a component 170. This allows for the different components 170 to avoid damage, such as by preventing a bucket from hitting a track by adjusting the speed of movement, or avoiding damage to surroundings. As described elsewhere herein, in some implementations, the pilot control manifold 145 has been shown to achieve a 25% efficiency compared to conventional hydraulic controls when the VCS 102 uses electronic signals to proportionally control the flow of various valves of the pilot control manifold 145. By using the electronic signals from the VCS 102 to open and/or close the valves 306, the pilot control manifold 145 allows for electronic control of a low-pressure pilot control, rather than electronic control directly on the main hydraulic manifold 150 operating at a high-pressure.

It will be appreciated that computing devices, computing systems and other equipment (e.g., earth-moving vehicle(s)) included within FIG. 1 are merely illustrative and are not intended to limit the scope of the present invention. The systems and/or devices may instead each include multiple interacting computing systems or devices, and may be connected to other devices that are not specifically illustrated, including via Bluetooth communication or other direct inter-device communication, through one or more networks such as the Internet, via the Web, or via one or more private networks (e.g., mobile communication networks), etc. More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated VCS 102 may in some embodiments be distributed in various components, some of the described functionality of the VCS 102 may not be provided, and/or other additional functionality may be provided.

It will also be appreciated that, while various items are illustrated as being stored in memory or on storage while being used, these items or portions of them may be transferred between memory and other storage devices for purposes of memory management and data integrity and execution/use. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the VCS 102 executing on computing device(s) 190) such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIGS. 2A-2I illustrate examples of earth-moving vehicles 200 having multiple types of on-vehicle data sensors positioned to support autonomous operations on a site for use with a pilot control manifold 145.

Figure 2A:
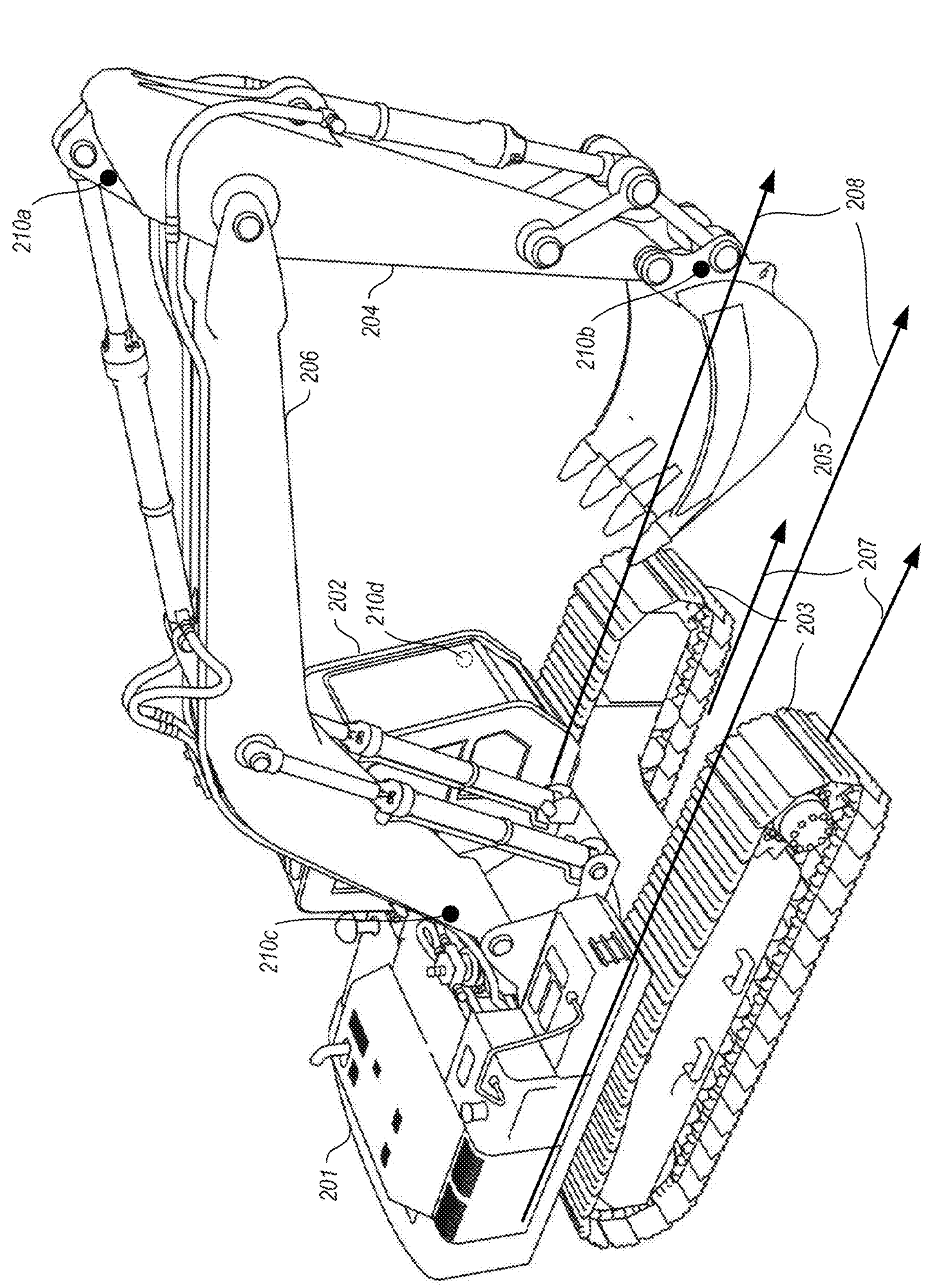
FIGS. 2A-2I illustrate examples of earth-moving construction and/or mining vehicles having multiple types of on-vehicle data sensors positioned to support autonomous operations on a site for use with a proportional pressure control system.

In particular, with respect to FIG. 2A, an example earth-moving vehicle 200*b* depicts an excavator with various components 170 (e.g., a digging boom 206, arm 204, bucket 205, tracks 203) is illustrated using an upper-side-frontal view from the side of the digging boom 206 and arm (or 'stick') 204 and opposite the side of the cabin 202, with the excavator vehicle further having a main body chassis 201 (e.g., enclosing an engine and counterweight, and including the cabin 202), tracks 203 and bucket (or 'scoop' or 'claw') attachment 205—in other embodiments, digging arm attachment components 170 other than a bucket may be used such as, for example, a hydraulic thumb, coupler, breaker, compactor, digging bucket, grading bucket, hammer, demolition grapple, tilt rotator, etc. In the example embodiment, four example inclinometers 210*a*-210*d* are further illustrated at positions that beneficially provide inclinometer data to compute the location of the bucket 205 and other parts of the digging boom 206/arm 204 relative to the cabin 202 of the excavator vehicle 200. In this example, three inclinometers 210*a*-210*c* are mounted at respective positions on the digging boom 206/arm 204 of the excavator vehicle (position 210*c* near the intersection of the digging boom 206 and the body of the excavator vehicle 200*b* position 210*b* near the intersection of the digging arm 204 and the bucket attachment 205, and position 210*a* near the intersection of the digging boom 206 and arm 204), such as to use single-axis inclinometers in this example, and with a fourth inclinometer 210*d* mounted within the cabin of the excavator vehicle 200*b* and illustrated at an approximate position using a dashed line, such as to use a dual-axis inclinometer that measures pitch and roll—data from the inclinometers may be used, for example, to track the position of the excavator components 170, including when a track heading direction 207 is determined to be different from a cabin/body heading direction 208 (not shown in this example). It will be appreciated that other quantities, positionings and types of inclinometers may be used in other embodiments.

Figure 2B:
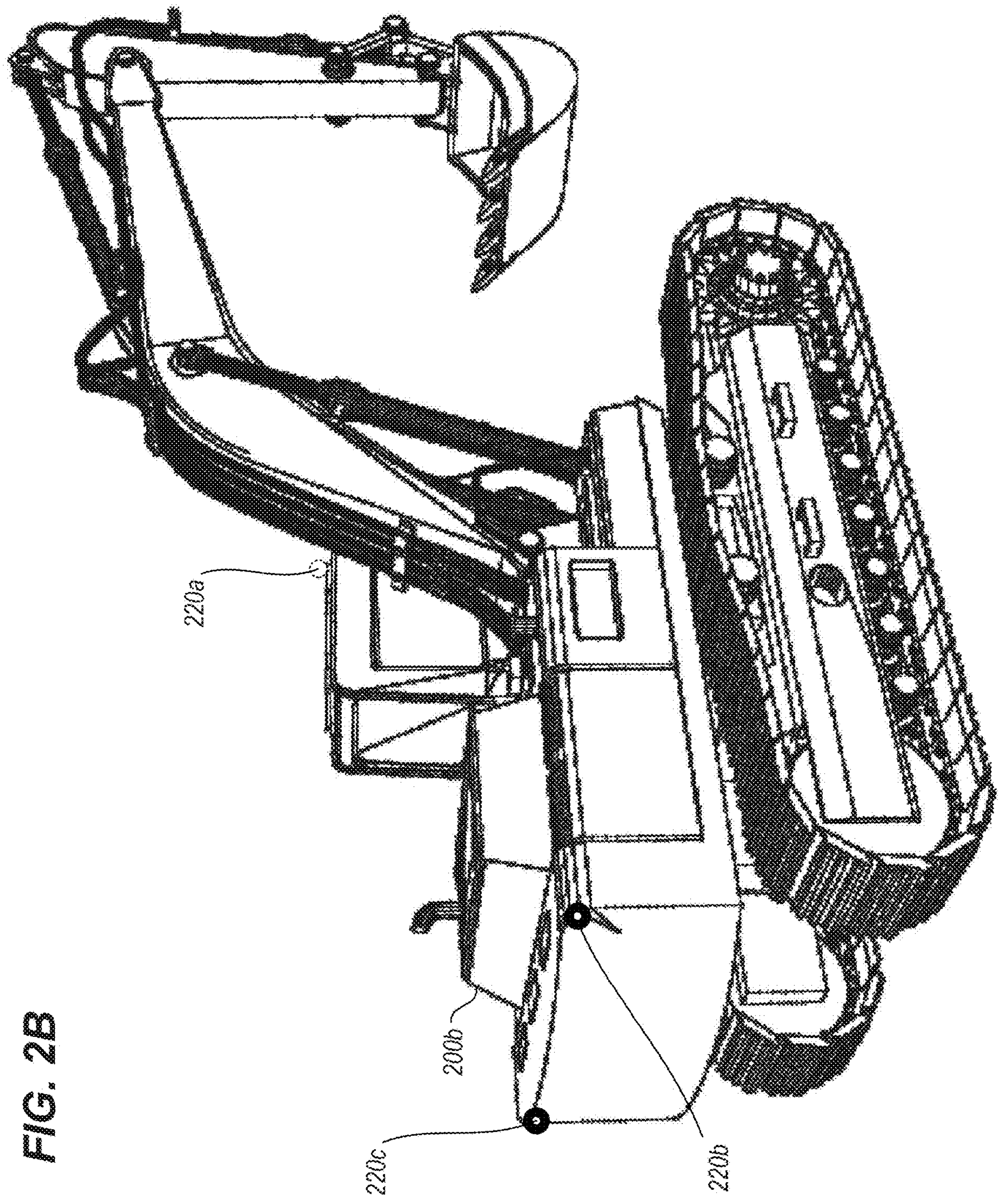
Figure 2C:
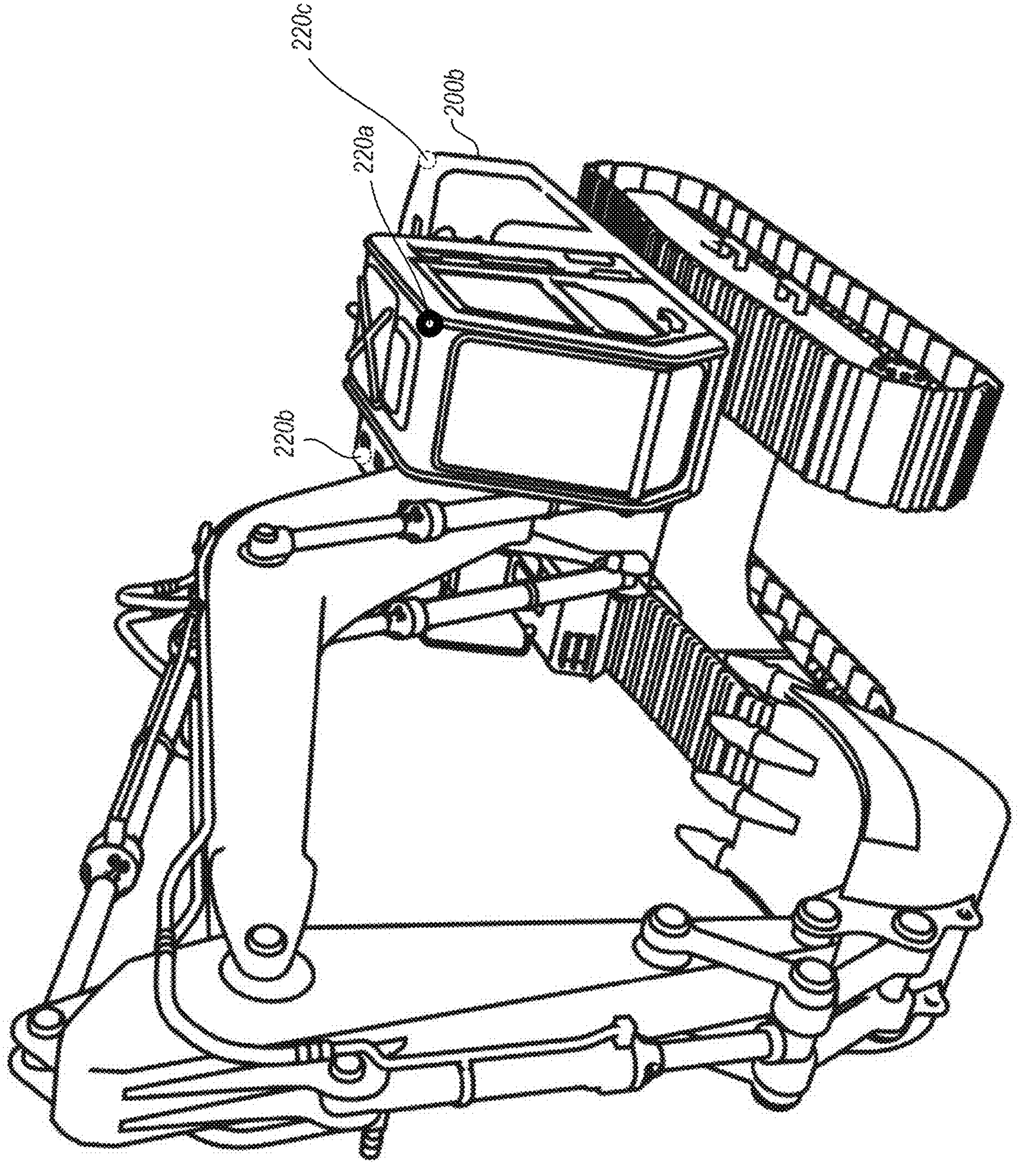

FIGS. 2B and 2C continue the example of FIG. 2A, and illustrate three example GPS antenna systems 220 at positions that beneficially provide GPS data to assist in determining the positioning and direction of the cabin/body, including to use data from the three GPS antennas to provide greater precision than is available from a single GPS antenna. In this example, the three GPS antenna systems 220*a*-220*c* are positioned on the excavator body chassis and proximate to three corners of the chassis (e.g., as far apart from each other as possible), such that differential information between GPS antenna systems 220*a* and 220*c* may provide cabin heading direction information, and differential information between GPS antenna systems 220*b* and 220*c* may provide lateral direction information at approximately 90° from that cabin heading direction information. In particular, in FIG. 2B, the example excavator vehicle 200*b* is shown using a side-rear view from the side of the boom/arm, with GPS antenna systems 220*b* and 220*c* illustrated on the back of the body chassis at or below the top of that portion of the body chassis, and with an approximate position of GPS antenna 220*a* on the cabin top near the front illustrated with dashed lines (e.g., as illustrated further in FIG. 2C). In FIG. 2C, the example excavator vehicle 200*b* is shown using an upper-side-frontal view from the side of the cabin, with GPS antenna system 220*a* shown on the cabin top near the front on the same side as GPS antenna system 220*c*, and with the positions of GPS antenna systems 220*b* and 220*c* illustrated through the body chassis with dashed lines (e.g., just below the top of the back of the body chassis, as illustrated in FIG. 2B). While not illustrated in FIGS. 2B-2C, in some embodiments, some or all of the GPS antenna systems 220 may be enabled to receive and use RTK data, such as RTK data received from an RTK positioning unit 230, to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the excavator vehicle is located) to improve accuracy of the GPS signals from the GPS antennas, so as to be part of one or more RTK-enabled GPS positioning units. In some embodiments, the RTK positioning unit 230 (not shown) may compute error rates corresponding to digital sensor signals and GPS coordinates. It will be appreciated that other quantities, positionings and types of GPS antenna systems (and/or antennas for other types of satellite-based navigation systems) may be used in other embodiments.

Figure 2D:
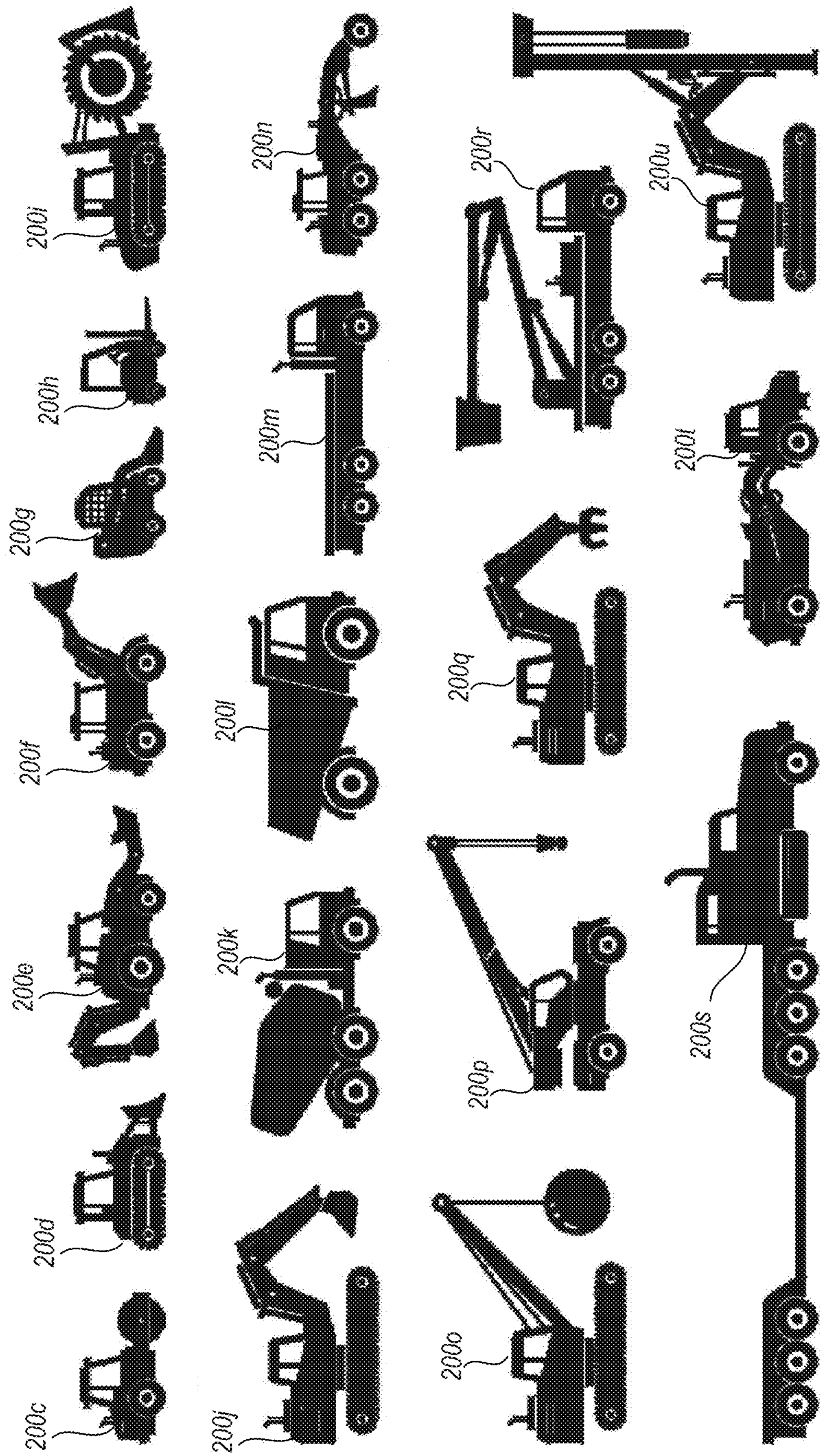
Figure 2E:
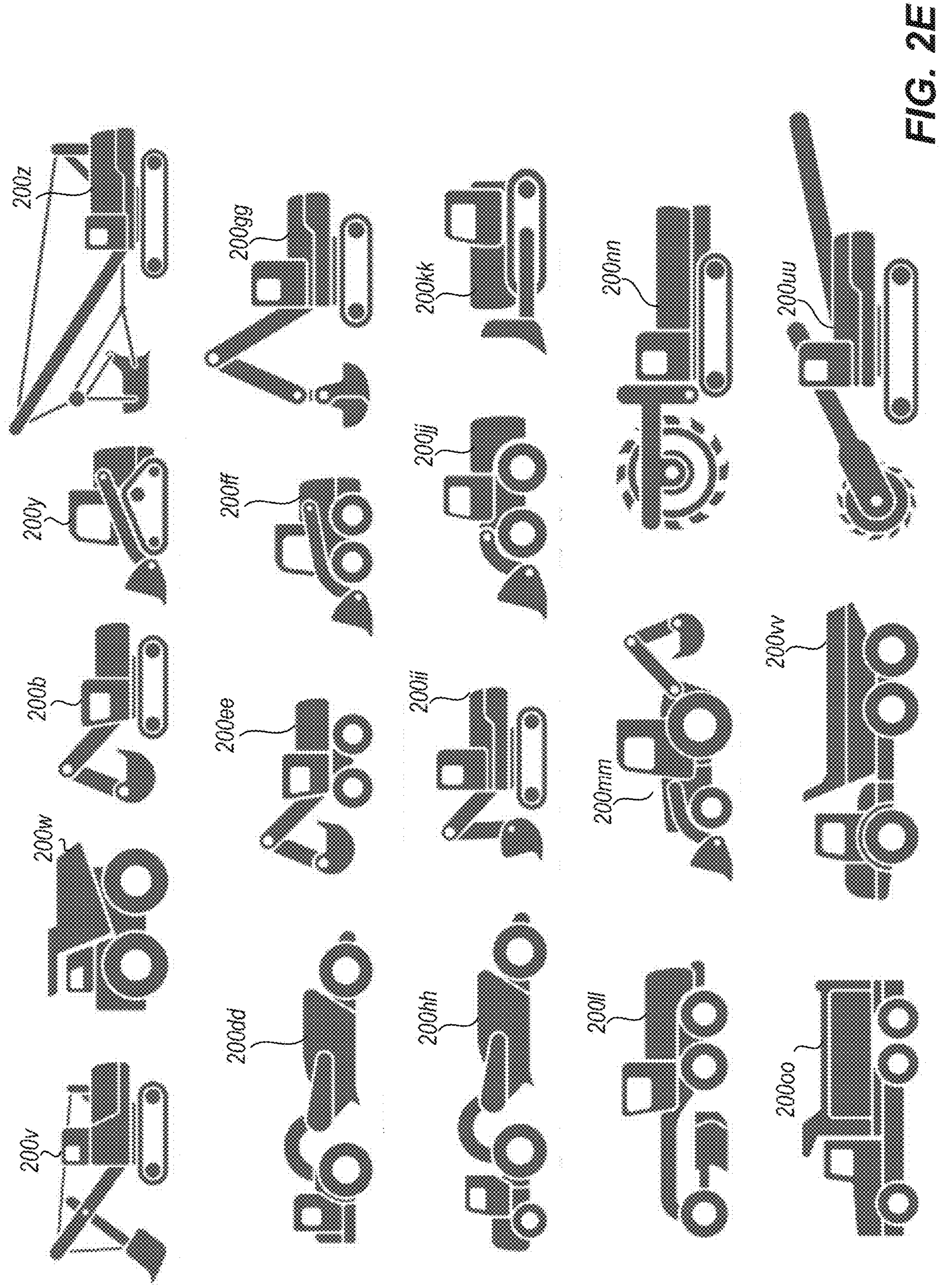

FIGS. 2D-2I continue the examples of FIGS. 2A-2C, with FIG. 2D illustrating information about a variety of non-exclusive example types of earth-moving construction and/or mining vehicles 200*c*-200*u* that may be controlled by embodiments of the VCS 102, including two example earth-moving tracked construction excavator vehicles 200*j* and 200*q* shown with different attachments (excavator vehicle 200*j* with a bucket attachment, and excavator vehicle 200*q* with a grapple attachment) that may be controlled by the VCS 102. Other example types of earth-moving construction vehicles 200 that are illustrated include a bulldozer 200*d*; a backhoe loader 200*e*; a wheel loader 200*f*; a skid steer loader 200*g*; a dump truck 200*l*; a forklift 200*h*; a trencher 200*i*; a mixer truck 200*k*; a flatbed truck 200*m*; a grader 200*n*; a wrecking ball crane 2000; a truck crane 200*p*; a cherry picker 200*r*; a heavy hauler 200*s*; a scraper 200*t*; a pile driver 200*u*; a road roller 200*c*; etc. It will be appreciated that other types of earth-moving construction vehicles may similarly be controlled by the VCS 102 in other embodiments. In a similar manner, FIG. 2E illustrates information about a variety of non-exclusive example types of earth-moving mining vehicles 200*v*-200*uu* that may similarly be controlled by embodiments of the VCS 102, including several example earth-moving tracked mining excavator vehicles, shown with different attachments (excavator vehicle 200*a* with a bucket attachment, excavator vehicle 200*z* with a dragline attachment, excavator vehicle 200*gg* with a clamshell extractor attachment, excavator vehicle 200*ii* with a front shovel attachment, excavator vehicle 200*uu* with a bucket wheel extractor attachment, excavator vehicle 200*v* with a power shovel attachment, etc.) that may be controlled by the VCS 102. Other example types of earth-moving mining vehicles 200 that are illustrated include a dump truck 20000; an articulated dump truck 200*vv*; a mining dump truck 200*w*; a bulldozer 200*kk*; a scraper 200*dd*; a tractor scraper 200*hh*; a wheel loader 200*jj*; a wheeled skid steer loader 200*ff*; a tracked skid steer loader 200*y*; a wheeled excavator 200*ee*; a backhoe loader 200*mm*; a motor grader 200*ll*; a trencher 200*nn*; etc. It will be appreciated that other types of earth-moving mining vehicles may similarly be controlled by the VCS 102 in other embodiments.

Figure 2F:
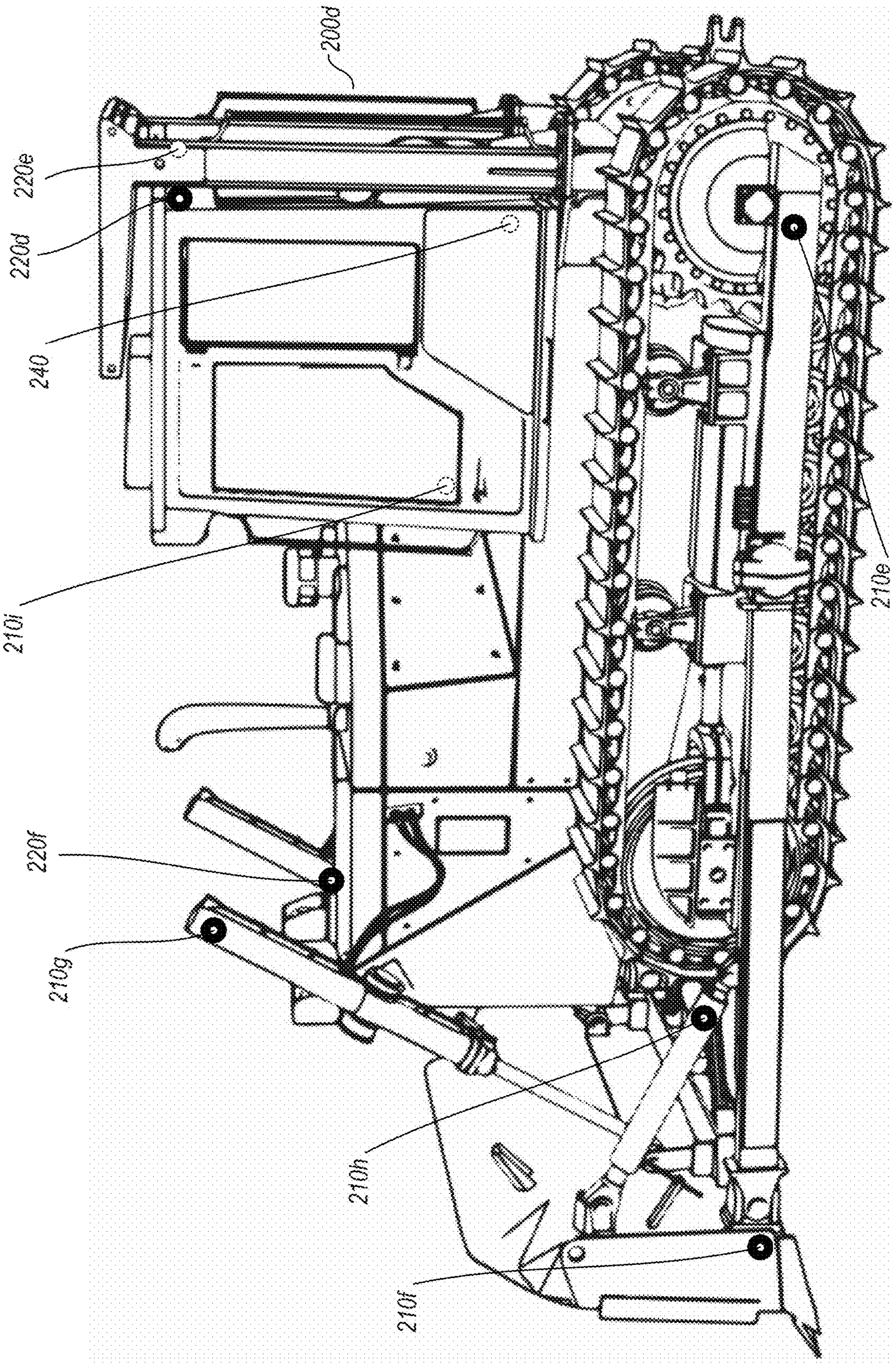
Figure 2G:
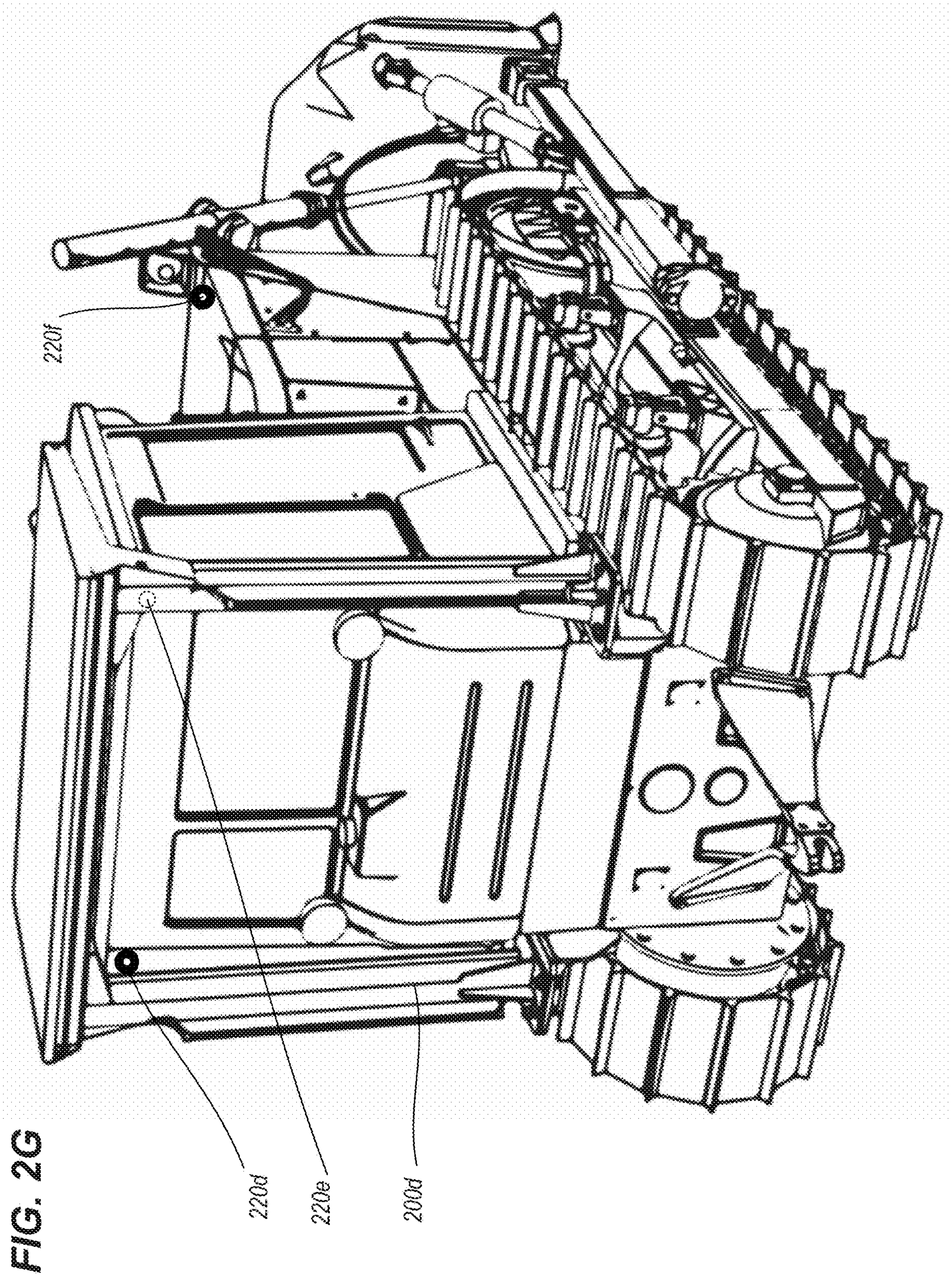

FIGS. 2F and 2G illustrate further example details about another earth-moving construction vehicle 200*d*, which in this example is a bulldozer vehicle, such as to illustrate example positions for GPS receivers of the GPS systems 220 (referred to generally as 220, or individually as 220*a*-200*n*, etc.) and/or inclinometers 210. In particular, FIG. 2F illustrates example information that includes various example inclinometers 210*e*-210*i*, and example GPS antennas/receivers of the GPS systems 220*d*-220*f*. The example inclinometers 210*e*-210*i* are further illustrated at positions that beneficially provide inclinometer data to compute the location of the blade or other front component attachment (and optionally other components 170 of the bulldozer 200*d*, such as the hydraulic arms) relative to the cabin of the bulldozer vehicle (e.g., at position 210*e* near the intersection of the track spring lifting arm and the body of the vehicle, position 210*f* near the intersection of the track spring lifting arm and the blade or other attachment, position 210*g* at one end of a hydraulic arm, position 210*h* at one end of the tilt cylinder, etc.), such as to use single-axis inclinometers in this example, and with another inclinometer 210*i* mounted within the cabin of the vehicle and illustrated at an approximate position using a dashed line, such as to use a dual-axis inclinometer that measures pitch and roll—data from the inclinometers may be used, for example, to track the position of the track spring lifting arm and attachment relative to the cabin/body of the vehicle. The example GPS systems 220 antennas/receivers are further illustrated at positions that beneficially provide GPS data to assist in determining the positioning and direction of the cabin/body, including to use data from the three antennas/receivers to provide greater precision than is available from a single GPS antenna/receiver. In this example, the three GPS antennas of the GPS systems 220*d*-220*f* are positioned on the body chassis and proximate to three corners of the chassis (e.g., as far apart from each other as possible), such that differential information between GPS systems 220*f* and 220*e* may provide cabin heading direction information, and differential information between GPS systems 220*d* and 220*e* may provide lateral direction information at approximately 90° from that cabin heading direction information. In particular, in FIG. 2F, the example earth-moving vehicle 200*d* is shown using a side view, with GPS systems 220*d* and 220*e* illustrated on the back of the body chassis at or below the top of that portion of the body chassis (using dashed lines to illustrate position

220*e*), and with an approximate position of GPS systems 220*f* on the chassis top near the front—the positions 220*d*-220*f* are further illustrated in FIG. 2G, in which the example earth-moving vehicle 200*d* is shown using an upper-side-back view, with GPS system 220*f* shown on the body top near the front on the same side as GPS system 220*e*. While not illustrated in FIGS. 2F-2G, some or all of the GPS antennas/receivers of the GPS systems 220 may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments.

Figure 2H:
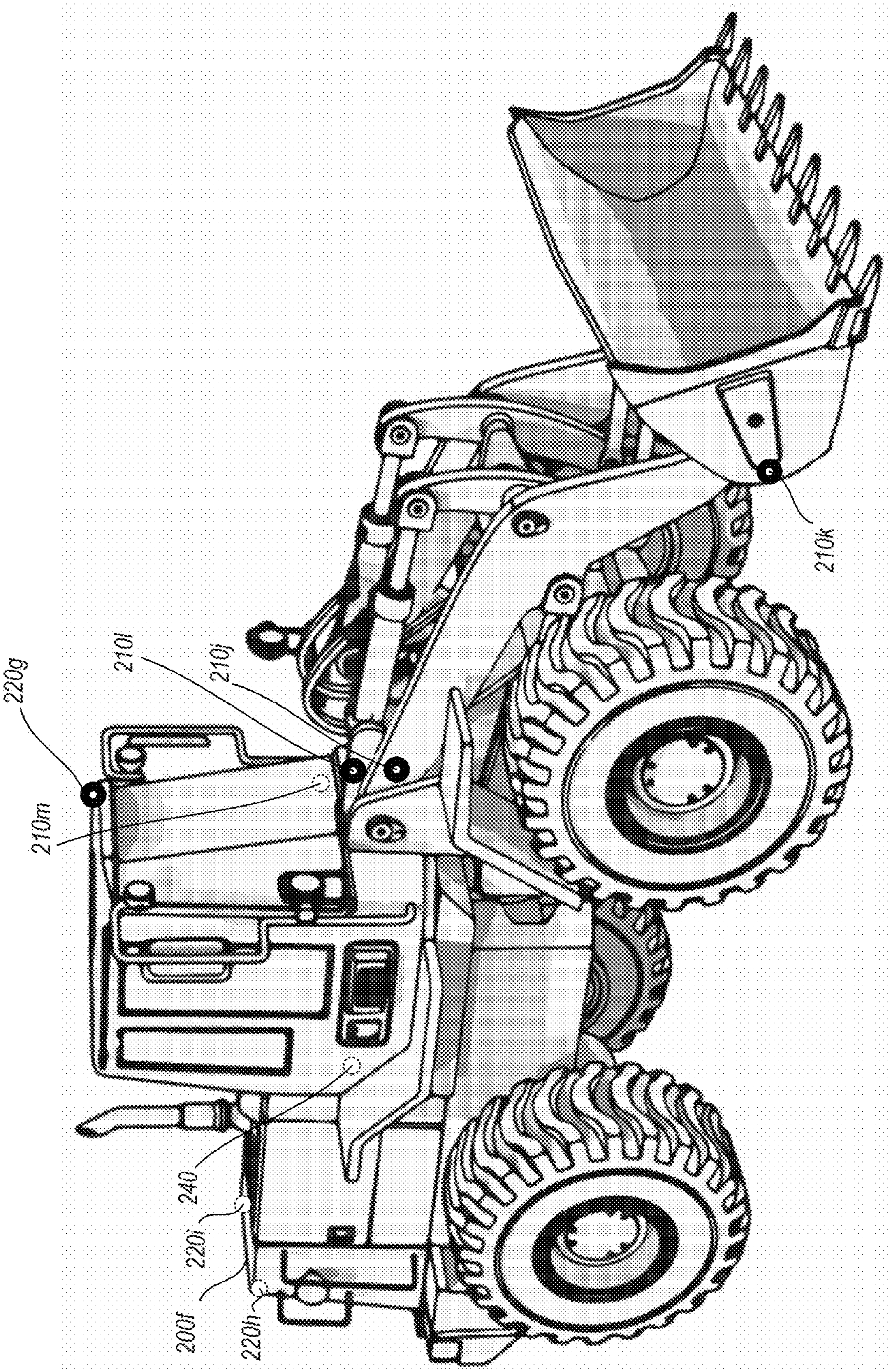
Figure 2I:
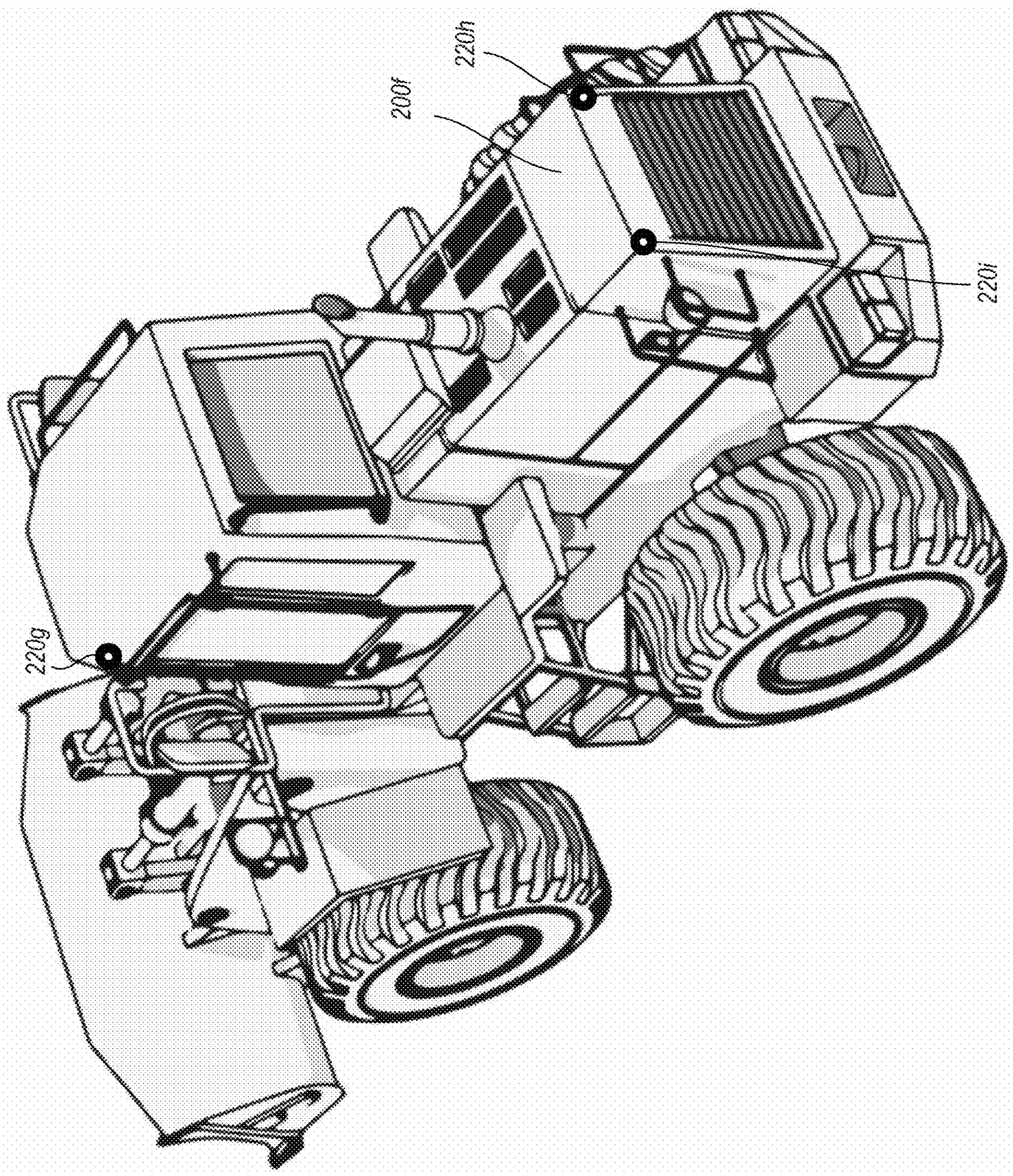
Figure 3A:
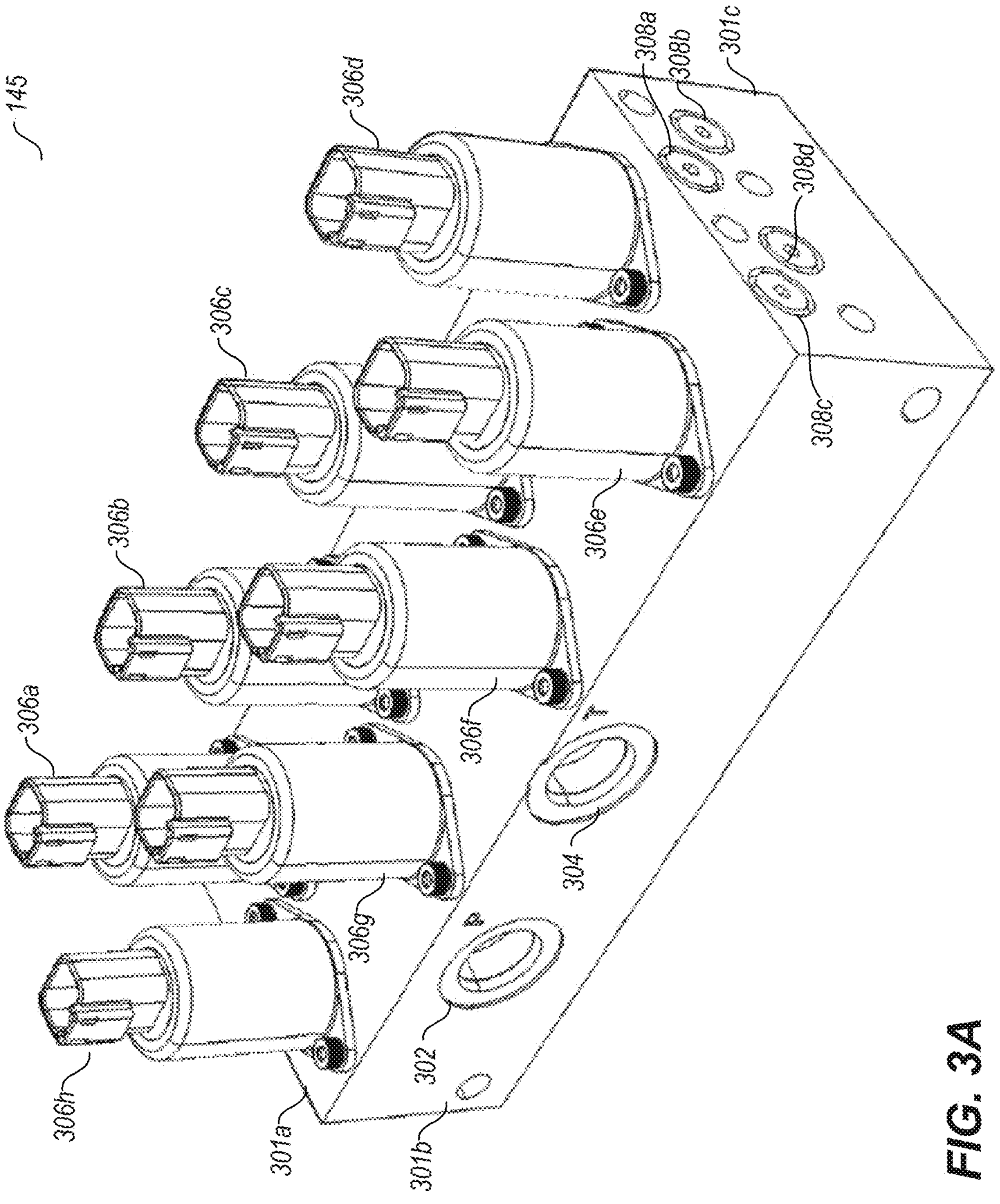
FIGS. 3A-3H illustrate different views of an example of an electronically controlled pilot control hydraulic manifold for use in controlling components of an earth-moving construction and/or mining vehicle.

FIGS. 2H and 2I illustrate further example details about another earth-moving construction vehicle 200*f*, which in this example is a wheel loader vehicle, such as to illustrate example positions for GPS systems 220 and/or inclinometers 210. In particular, FIG. 2H illustrates example information that includes various example inclinometers 210*j*-210*m*, and example antennas/receivers of the GPS systems 220*g*-220*i*. The example inclinometers 210*j*-210*m* are further illustrated at positions that beneficially provide inclinometer data to compute the location of the bucket or other front attachment (and optionally other parts of the wheel loader, such as the hydraulic arms) relative to the cabin of the loader vehicle (e.g., at position 210*j* near the intersection of the boom lifting arm and the body of the vehicle, position 210*k* near the intersection of the boom lifting arm and the bucket or other attachment, position 210*l* at one end of a hydraulic arm, etc.), such as to use single-axis inclinometers in this example, and with another inclinometer 210*m* mounted within the cabin of the vehicle and illustrated at an approximate position using a dashed line, such as to use a dual-axis inclinometer that measures pitch and roll-data from the inclinometers may be used, for example, to track the position of the boom lifting arm and attachment relative to the cabin/body of the vehicle. The example antennas/receivers of the GPS systems 220 are further illustrated at positions that beneficially provide GPS data to assist in determining the positioning and direction of the cabin/body, including to use data from the three GPS antennas to provide greater precision than is available from a single GPS antenna. In this example, the three GPS systems 220*g*-220*i* are positioned on the body chassis and proximate to three corners of the chassis (e.g., as far apart from each other as possible), such that differential information between GPS systems 220*g* and 220*i* may provide cabin heading direction information, and differential information between GPS systems 220*h* and 220*i* may provide lateral direction information at approximately 90° from that cabin heading direction information. In particular, in FIG. 2H, the example earth-moving vehicle 200*f* is shown using a side-frontal view, with GPS systems 220*h* and 220*i* illustrated on the back of the body chassis at or below the top of that portion of the body chassis (using dashed lines to illustrate their positions), and with an approximate position of GPS system 220*g* on the chassis top near the front—the positions 220*g*-220*i* are further illustrated in FIG. 2I, which is shown using an upper-side-back view, with GPS system 220*g* shown on the body top near the front on the same side as GPS system 220*i*. While not illustrated in FIGS. 2H and 2I, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments FIGS. 3A-3H illustrate different views of a pilot control manifold 145 for use in controlling components of an earth-moving construction and/or mining vehicle 200. As shown in FIG. 3A, the pilot control manifold 145 may include a plurality of valves 306 (referred to generally as 306, or individually as 306*a*, 306*b*, 306*c*, 306*d*, 306*e*, 306*f*, 306*g*, 306*h*, etc.) that extend out of a top surface 301*a* of the pilot control manifold 145. In some implementations, the pilot control manifold 145 may be substantially rectangular in shape and may include various internal channels 308 connected to the valves 306. In further implementations, other shapes for the pilot control manifold 145 are also contemplated, other than a rectangular shape, such as to accommodate installation of the pilot control manifold 145 in different earth-moving construction vehicles 200. As shown in FIG. 3A, the pilot pressure line 302 and the tank line 304 may be connected to the internal channels 308 to provide low-pressure to the valves 306. In some implementations, the pilot pressure line 302 and the tank line 304 may be positioned on a front surface 301*b* of the pilot control manifold 145 and the pilot pressure line 302 and the tank line 304 may be connected to a regulated pressured system (not shown) to provide low-pressure to the valves 306.

In some implementations as shown in FIG. 3A, depicting a front-right perspective view of the pilot control manifold 145, the pilot control manifold 145 may have eight valves 306 to allow for eight different valve couplings (not shown) for connection to the main hydraulic manifold 150 and control of various components 170. In some examples, such as with respect to excavator vehicles, this eight-valve configuration is advantageous compared to conventional manifold designs that only use four valves in each manifold. The conventional manifold design with four valves requires four separate conventional manifolds to fully connect all of the components 170 of an excavator including add on tools like a thumb, grapple, shears, etc. (e.g., 3=2×joysticks+1×pedals+½ for tool), whereas, the pilot control manifold 145 with eight-valve 306 attachments can connect the conventional excavator components 170 as well as an add-on tool with a single eight valve manifold as a substitute for both separate joystick manifolds.

As shown in FIG. 3A, the pilot control manifold 145 may include eight connectors (e.g., valves 306) for connecting to a main hydraulic manifold 150. These eight connectors (e.g., valves 306) on the pilot control manifold 145 allow a single pilot control manifold 145 to be used in a system as compared to the multiple four connector manifolds 300 used in a conventional system. The pilot control manifold 145 is electronically controlled by commands from the VCS 102. This allows the pilot control manifold 145 to separately open, or partially open, different valves as needed to control various components. Additionally, the pilot control manifold 145 may control the speed at which the different valves open and/or close in order to control the speed of movement of various components. It should be understood that the pilot control manifold 145 acts as a low-pressure, electronically controlled hydraulic manifold. In some embodiments, low-pressure control may be operated as a pilot control pressure of 55 Bars.

Figure 3B:
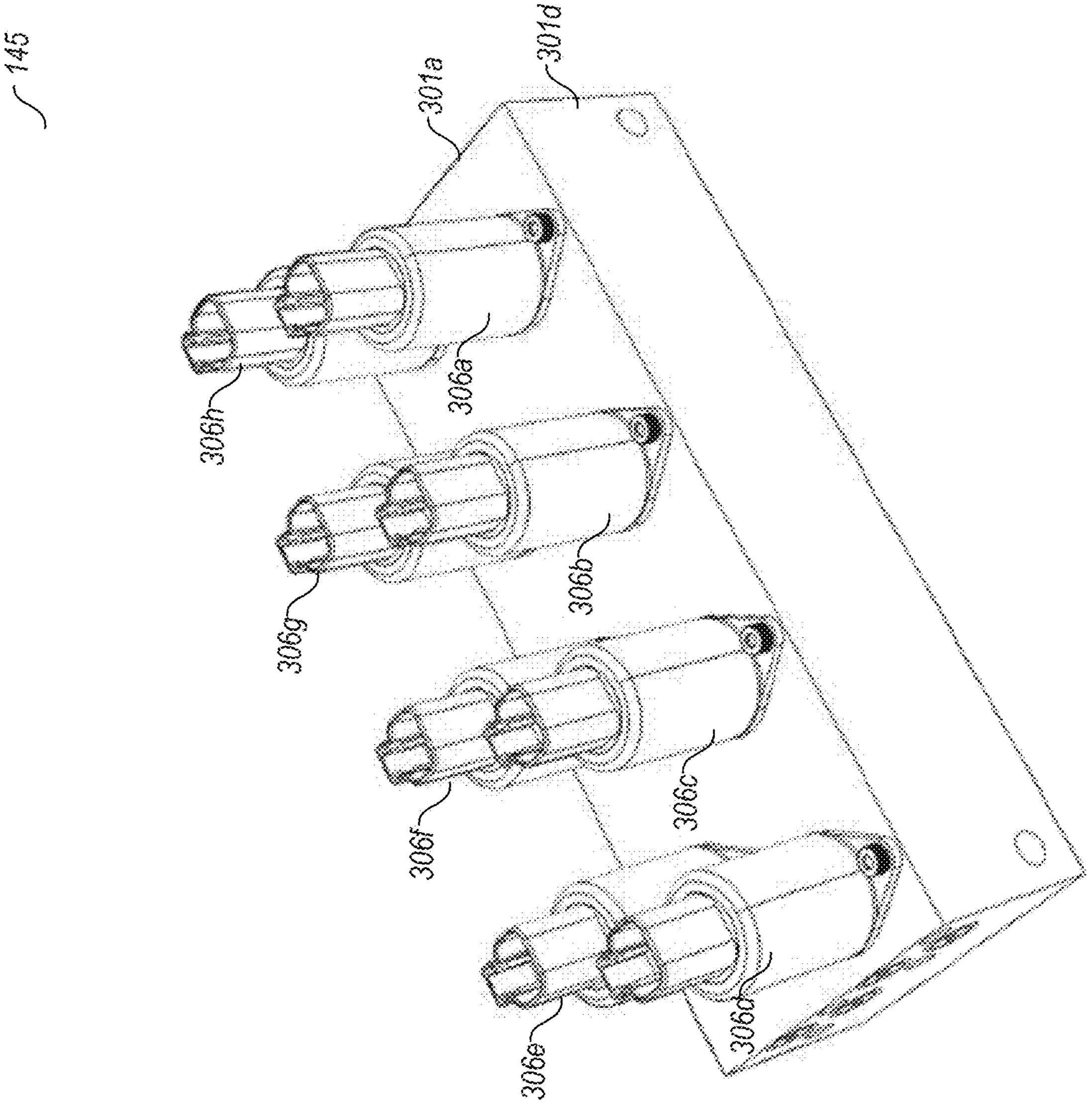

As shown in FIG. 3A, the valves 306 may be electronically coupled to the VCS 102 to provide electronic signals as instructions for opening and/or closing the valves 306. The valves 306 may be mounted on a top surface 301*a* of the pilot control manifold 145. In some implementations, the top surface 301*a* may be machined to accept the electronic valves 306 and allow the valves 306 to be quickly mounted onto the pilot control manifold 145, such as by using screws or other fasteners to connect the valves 306 to the top surface 301*a*. As shown in FIG. 3B depicting a right-rear perspective view of the pilot control manifold 145, the valves 306 may be positioned in two rows of four valves 306 each on the top surface 301*a* in order to allow each valve to access the internal channels 308. In some implementations, as shown in FIG. 3B, the valves 306 in the rows may be offset from the other row of valves 306 in order to more efficiently use the space on the top surface 301*a* of the pilot control manifold 145. In some implementations, offsetting the valves 306 allows the mounting extensions of the valves 306 to fit between the rows on the top surface 301*a*. As shown in FIG. 3B, the back surface 301*d* may be substantially flat and in some implementations may include holes for attaching the pilot control manifold 145 to an earth-moving vehicle 200.

Figure 3C:
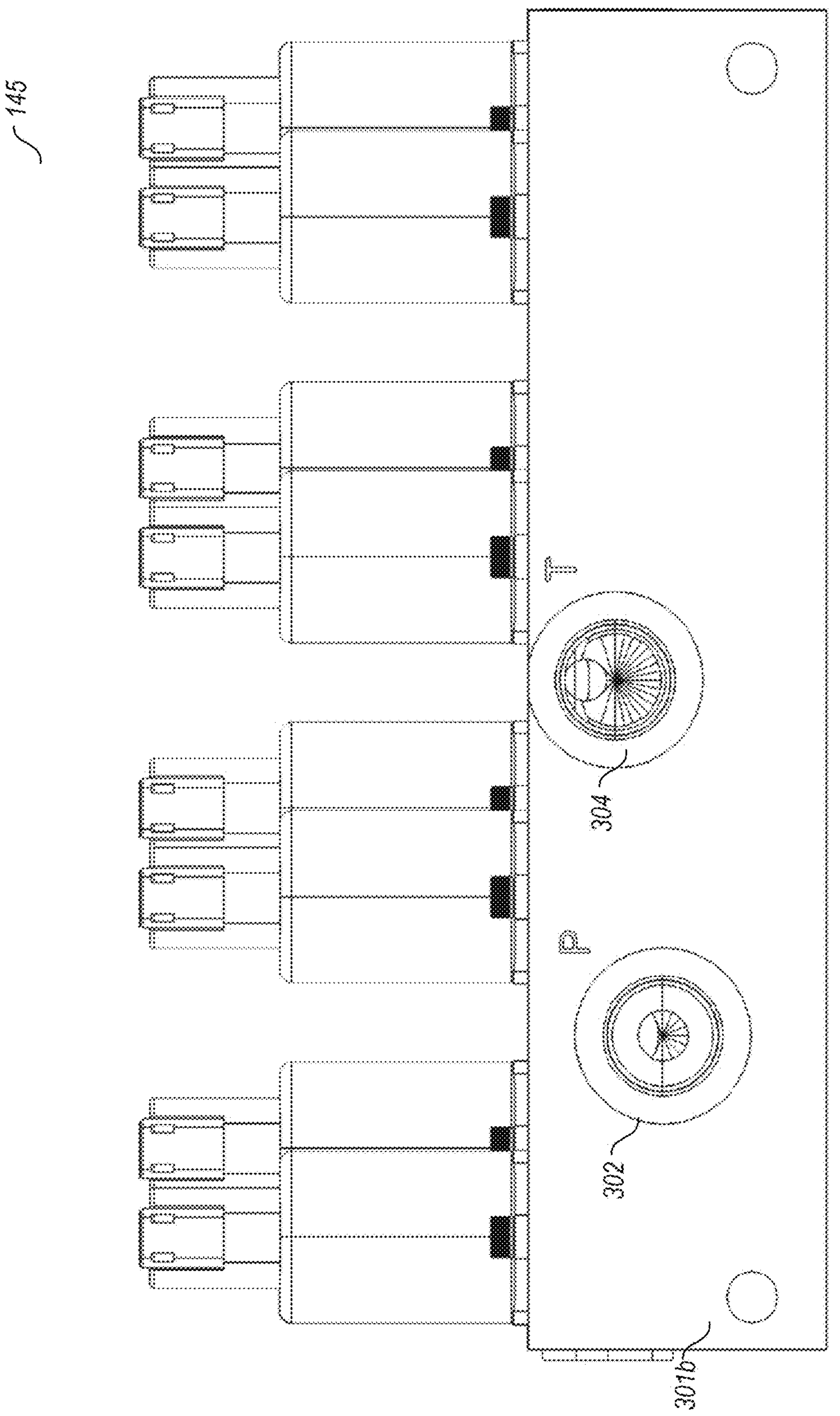
Figure 3D:
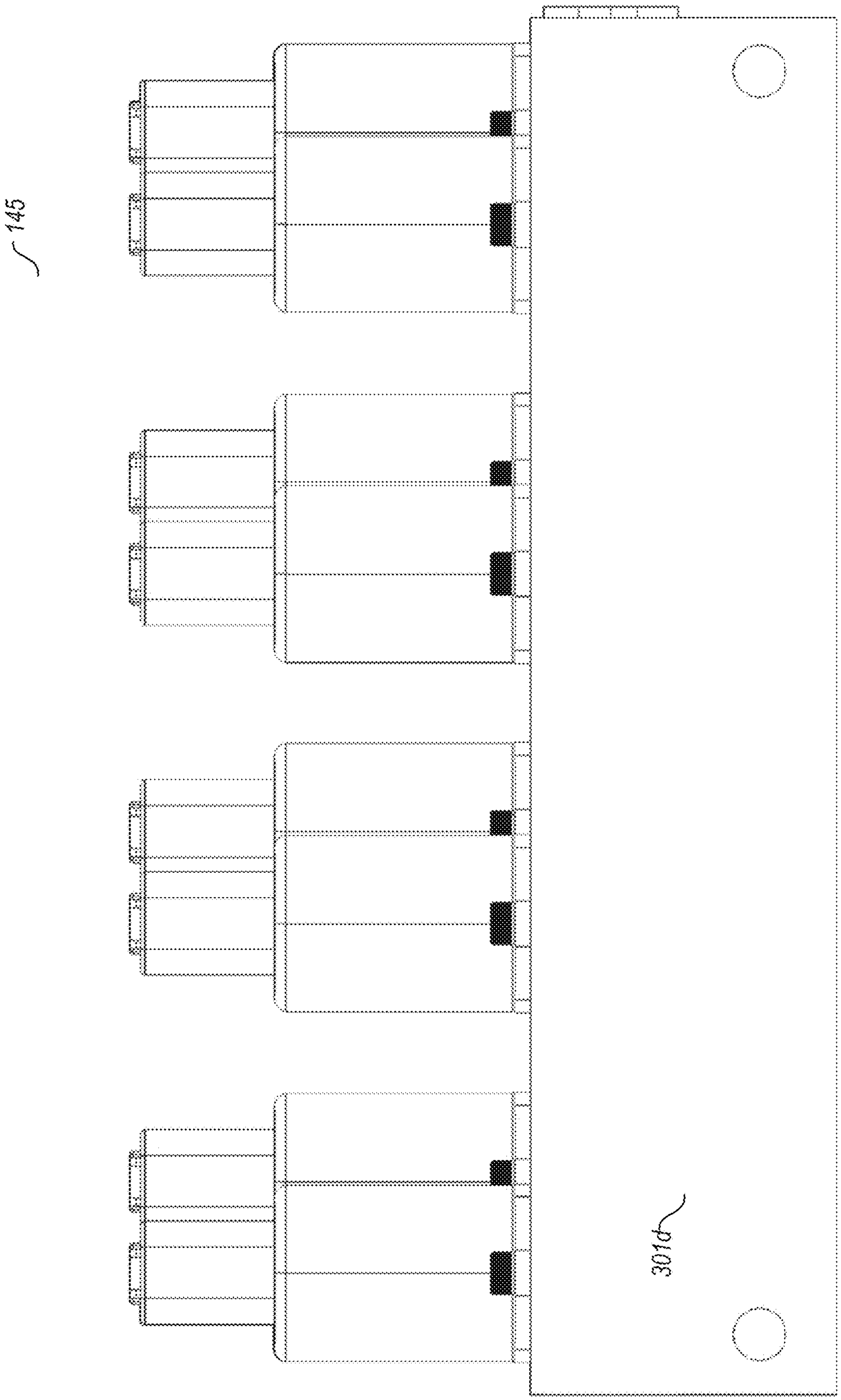

FIG. 3C illustrates a front-view of the pilot control manifold 145. As shown in FIG. 3C, the access points for the pilot pressure line 302 and the tank line 304 may be positioned on the front surface 301*b*. It should be understood that in further implementations, the access points for the pilot pressure line 302 and the tank line 304 may be positioned in different configurations to allow for the access points to connected as needed for various earth-moving construction vehicles 200. FIG. 3D illustrates a back-view of the pilot control manifold 145. As shown in FIG. 3D, the back surface 301*d* may be substantially flat and the valves 306 may extend outward from the top surface 301*a*

Figure 3E:
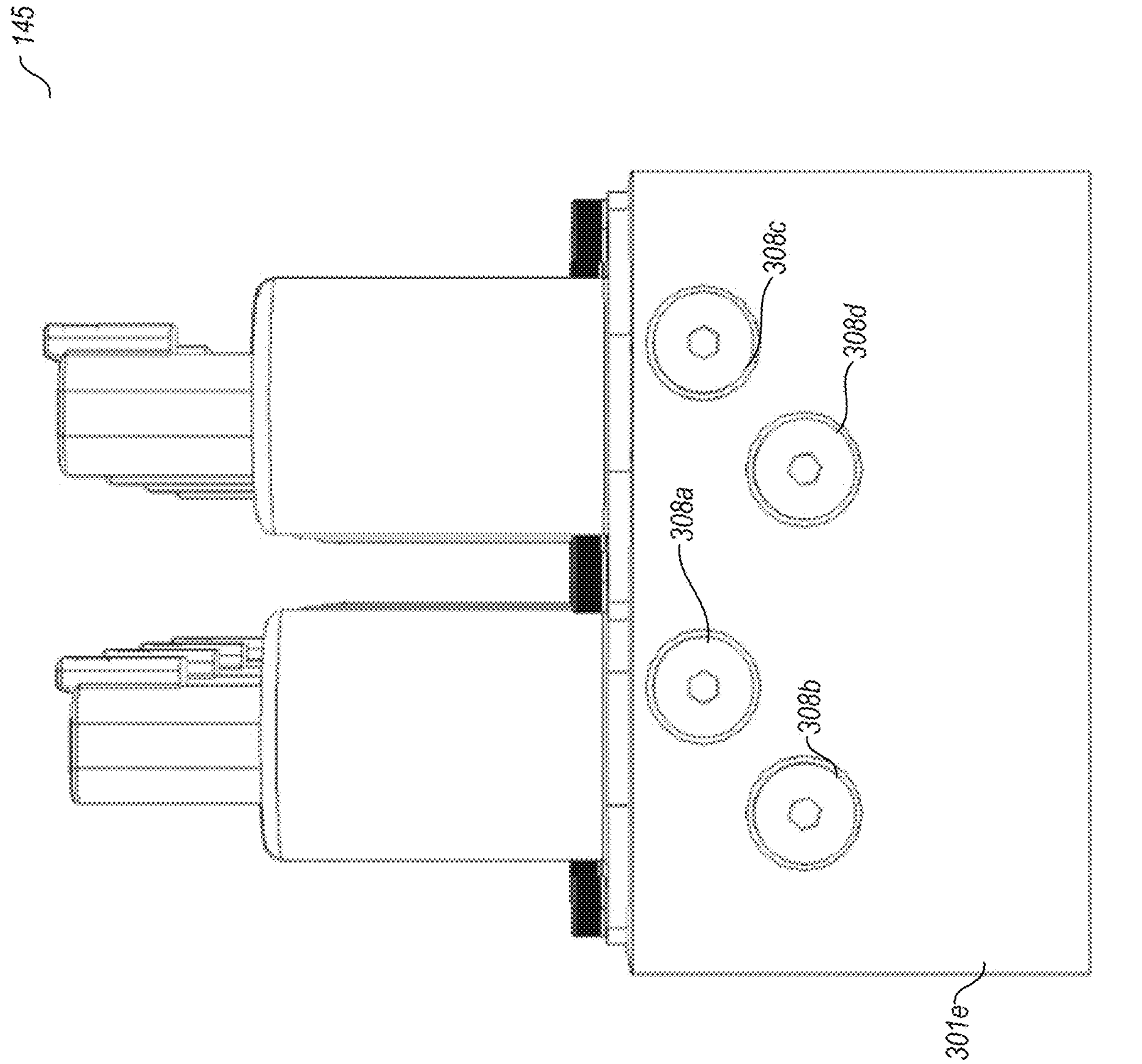
Figure 3F:
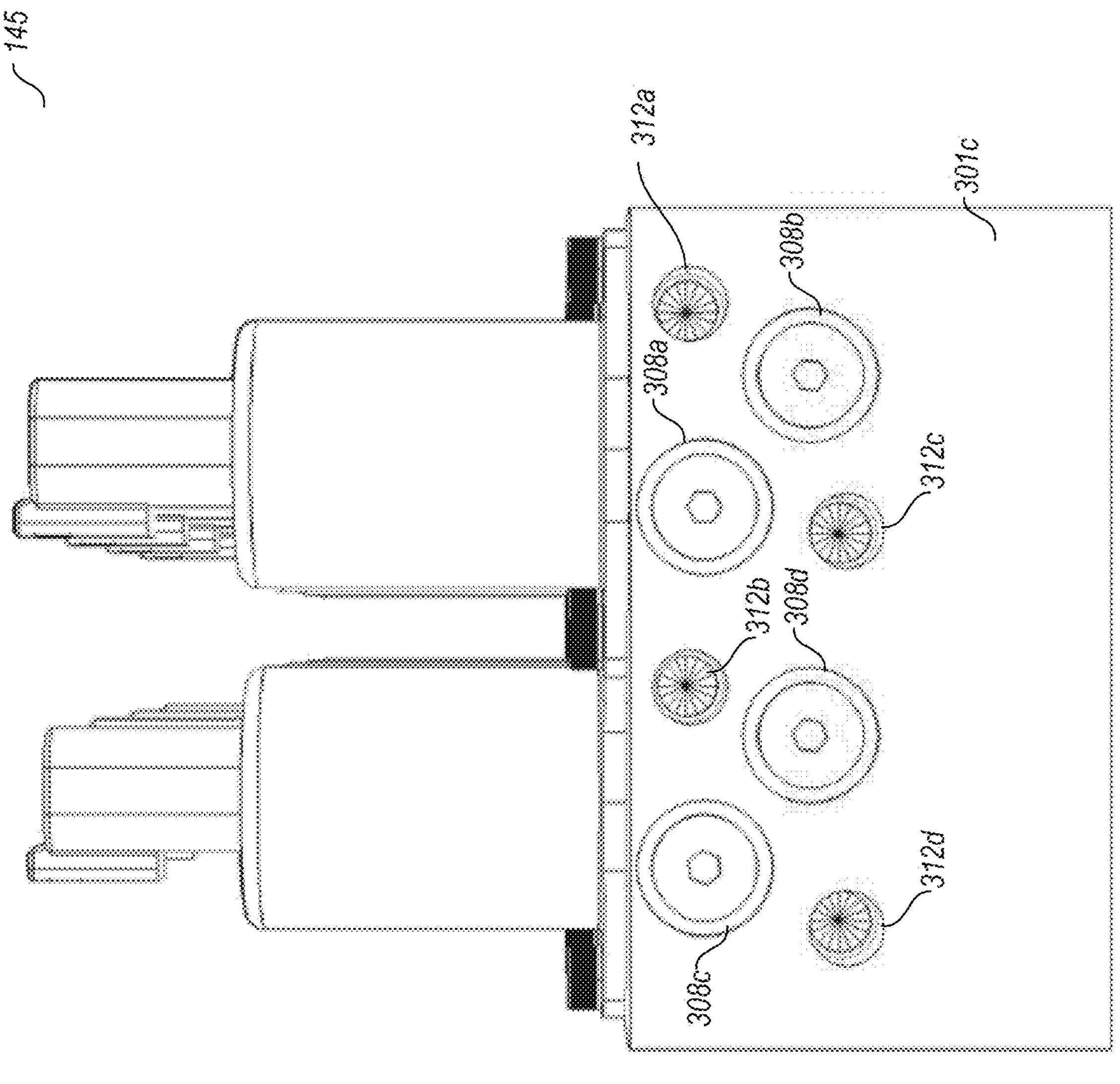

FIG. 3E illustrates a left-side view of the pilot control manifold 145. As shown in FIG. 3E, the left surface 301*e* may include end caps of the internal channels 308. As shown in FIG. 3E, the internal channels 308 may pass under the valves 306 such the internal portions of the valves connect with the internal channels under the row of vales (e.g., the front row of vales connects with internal channels 308*c* and 308*d* and the rear row of valves connects with internal channels 308*a* and 308*b*). FIG. 3F illustrates a right-side view of the pilot control manifold 145. As shown in FIG. 3F, the internal channels 308 may have end caps on the right surface 301*c*. In some implementations, as shown in FIG. 3F, the surface may also include extension ports 312 (referred to generally as 312, or individually as 312*a*, 312*b*, 312*c*, 312*d*, etc.) that allow for extension manifolds (such as with respect to FIGS. 7A-7C) to be connected to the internal channels 308 and use the same internal channels for the extension manifolds.

Figure 3G:
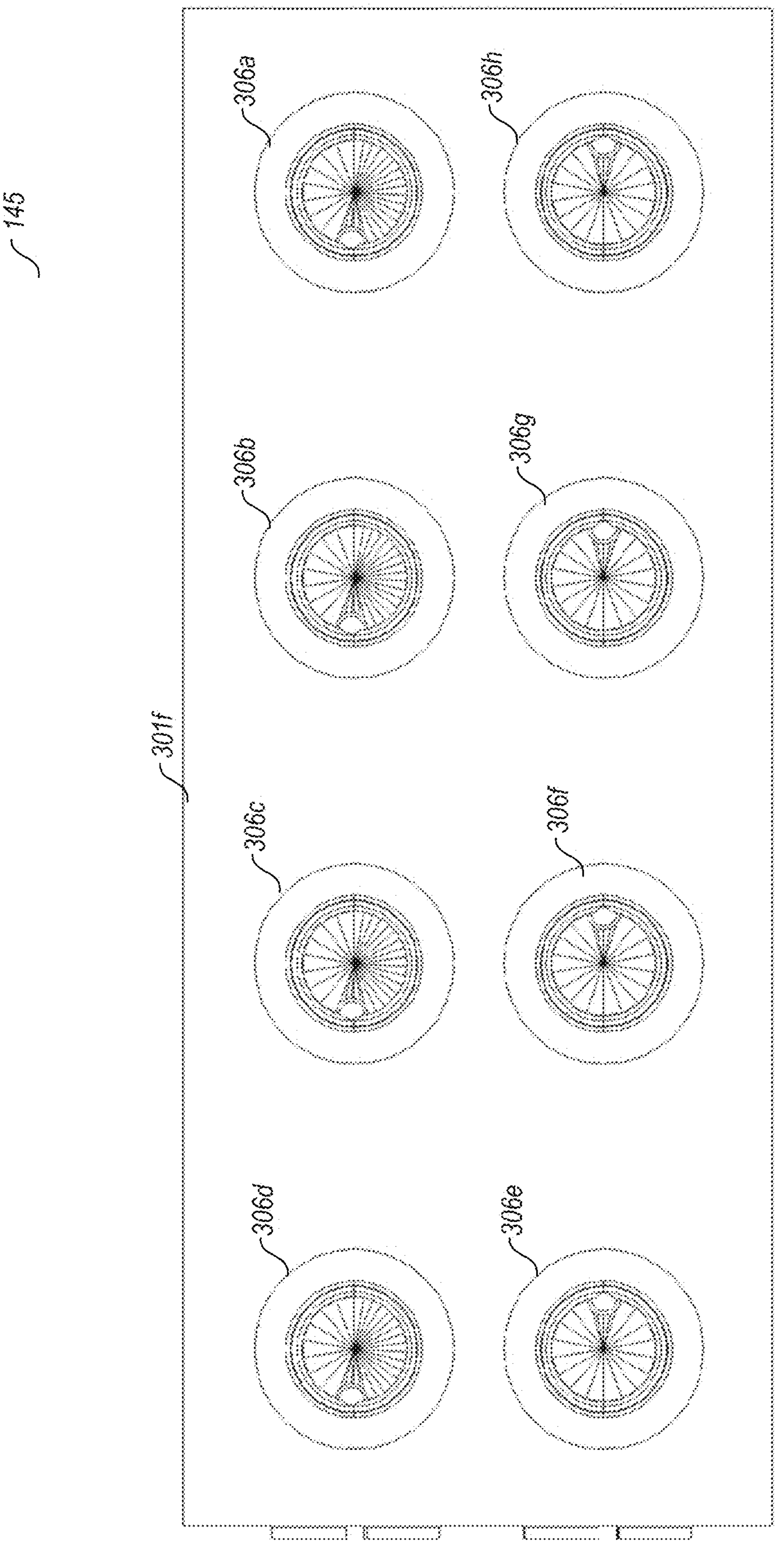
Figure 3H:
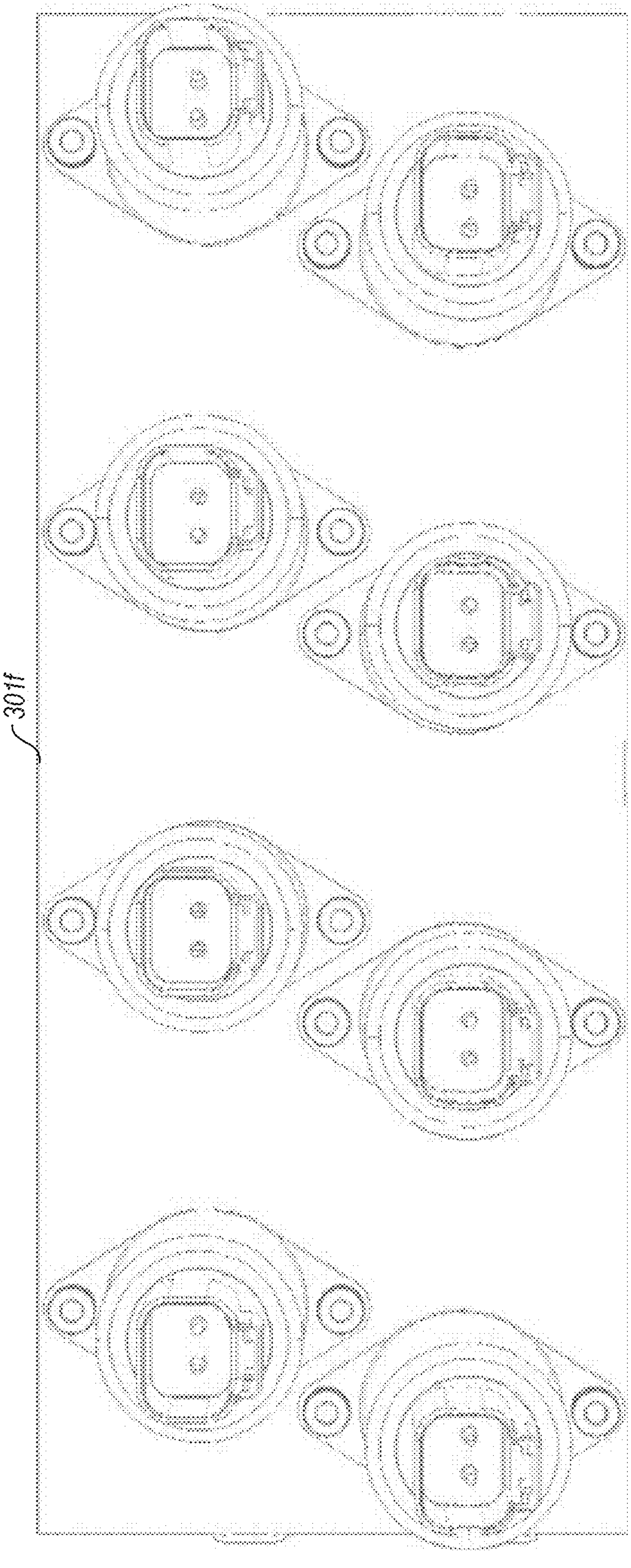

FIG. 3G illustrates a bottom-view of the pilot control manifold 145. As shown in FIG. 3G the bottom ends of the valves 306 may be positioned along the bottom surface 301*f*. FIG. 3H illustrates a top-view of the pilot control manifold 145. As shown, the valves 306 may be connectable to signal lines for the VCS 102 to send instructions as electronic signals to each of the valves 306. In some implementations, the pilot control manifold 145 is positioned outside of a cabin of an earth-moving vehicle 200. This is different from conventional systems that use a component control 104 to send signals to a main hydraulic manifold 150 where those high-pressure lines are inside the cabin connected to the component control 104. It creates a potential safety issue of those high-pressure lines burst or fail while an operator is in the cabin. By using a low pressure, electronically controlled pilot control manifold 145, if a failure of the high-pressure line occurs, it will happen outside of the cabin, as no high-pressure lines are inside the cabin in this implementation. By only using low-pressure lines in the cabin and pilot control manifold 145 connected to the main hydraulic manifold 150, the operator safety is increased as failures to the high-pressure lines will happen away from the operator in the cabin.

Figure 4A:
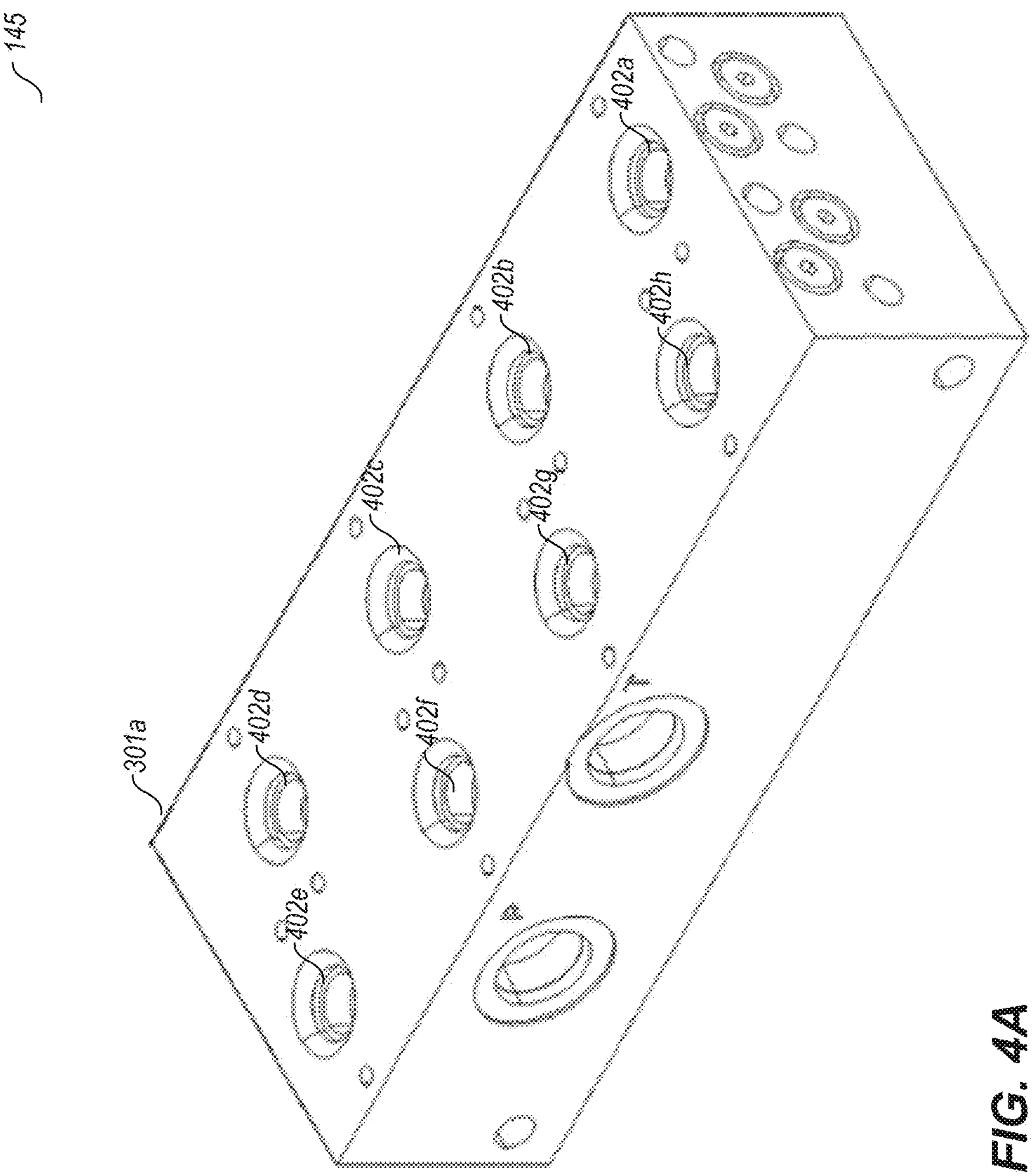
FIGS. 4A and 4B illustrate additional and cross-sectional views of an example of an electronically controlled pilot control hydraulic manifold for use in controlling components of an earth-moving construction and/or mining vehicle.
Figure 4B:
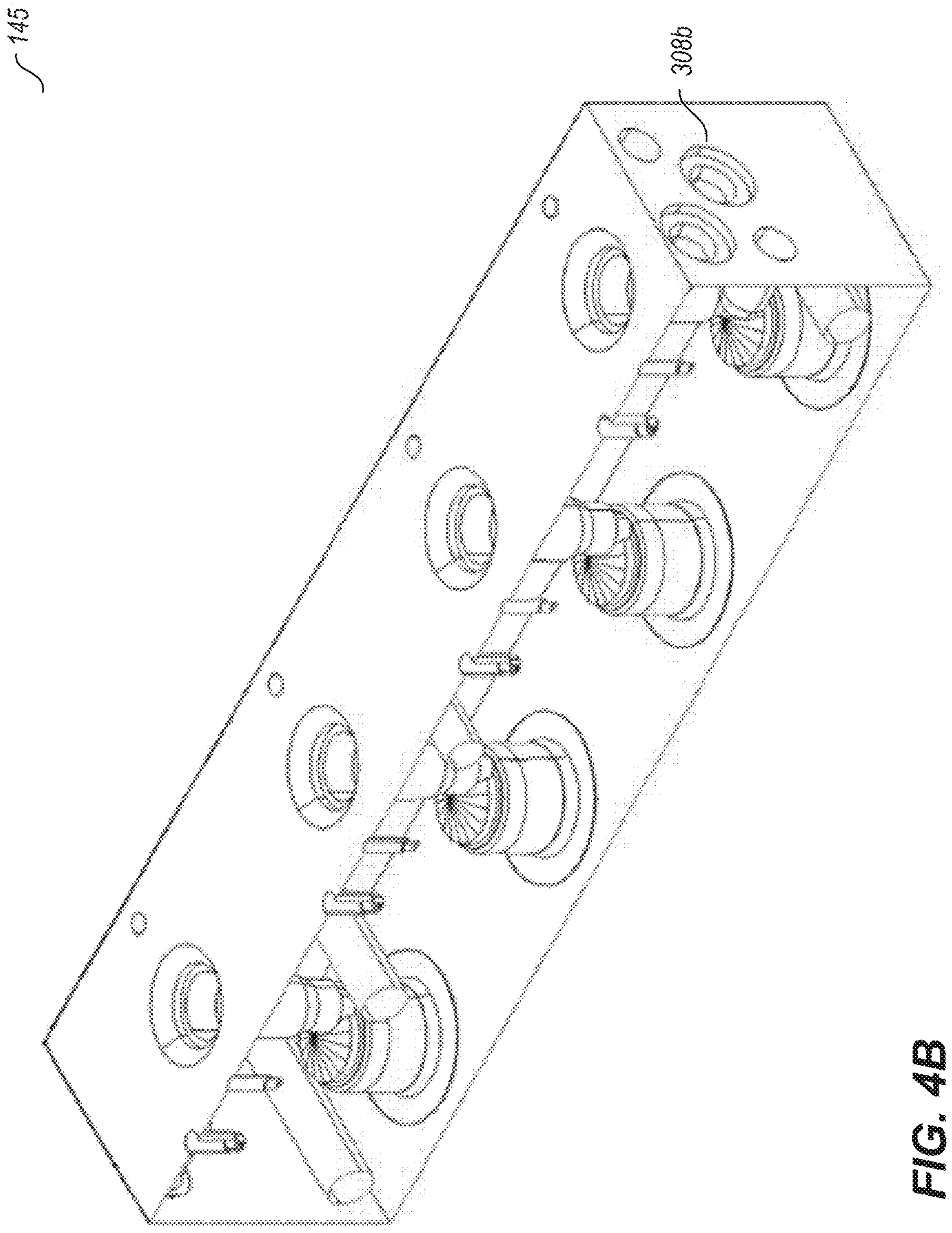

FIG. 4A illustrates an example of a pilot control manifold 145. In this example in FIG. 4A, the valves 306 are not connected and the valve holes 402 (referred to generally as 402, or individually as 402*a*, 402*b*, 402*c*, 402*d*, 402*e*, 402*f*, 402*g*, 402*h*, etc.) are shown in the top surface 301*a*. As shown, the valve holes are machined into the pilot control manifold 145 to allow the valves 306 to be positioned and mounted using the mounting attachment mechanisms. FIG. 4B illustrates a cross-sectional view of the pilot control manifold 145 without the valves 306. As shown, the internal channels 308 extend through the interior of the pilot control manifold to connect the valves 306 to the low-pressure and high-pressure systems. As the low-pressure valves open or close on the pilot control manifold 145, it causes the main hydraulic manifold 150 to provide proportionally high pressure to the various components 170.

Figure 5:
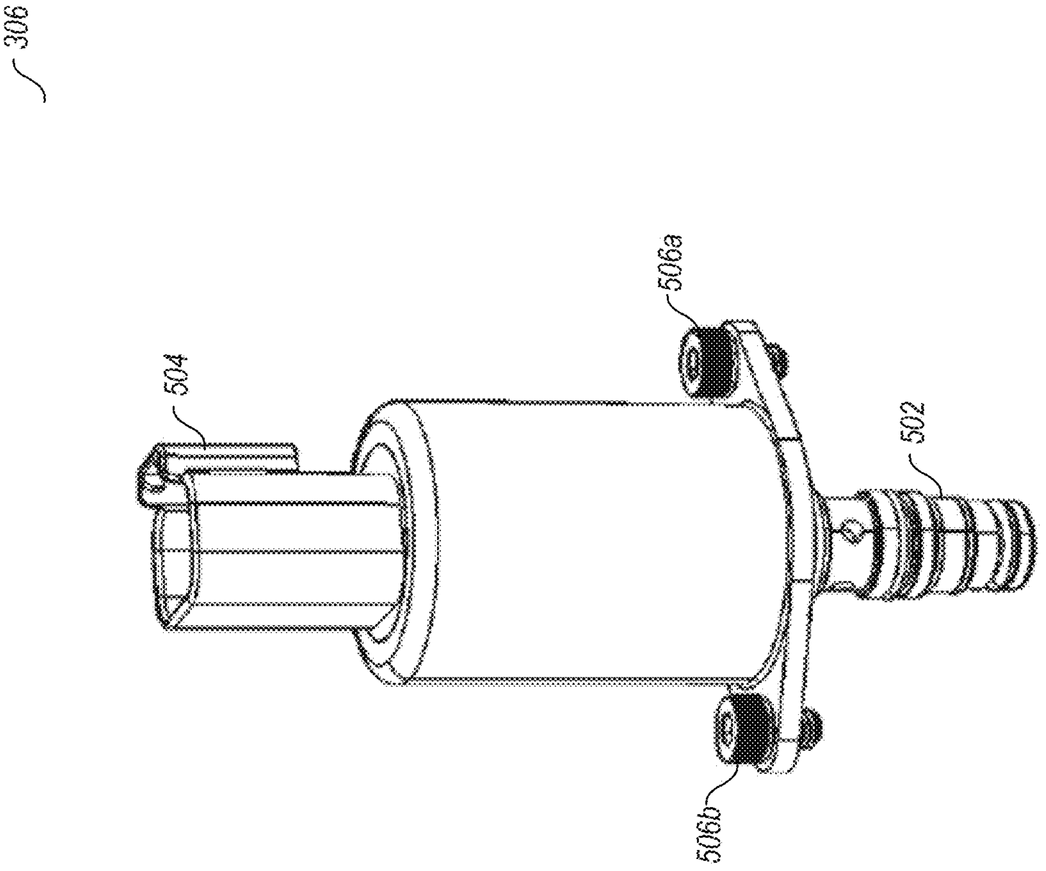
FIG. 5 illustrates an example valve for use with a pilot control hydraulic manifold.

FIG. 5 is an illustrated example of an electronically controlled valve 306. As shown in FIG. 5, the valve 306 includes an attachment component 504 for connecting to the VCS 102 to receive instructions as electronic signals for proportionally opening the valve. In some implementations, the valve 306 may include an internal section 502 that extends within the valve holes 402 and based on received signals the internal section 502 of the valve 306 is actuated to cause proportional control at the pilot control manifold 145. As shown in FIG. 5, in some implementations, mounting hardware 506 (referred to generally as 506, or individually as 506*a* or 506*b*), such as screws or other attachment mechanisms can be used to connect the valve 306 to the pilot control manifold 145.

Figure 6:
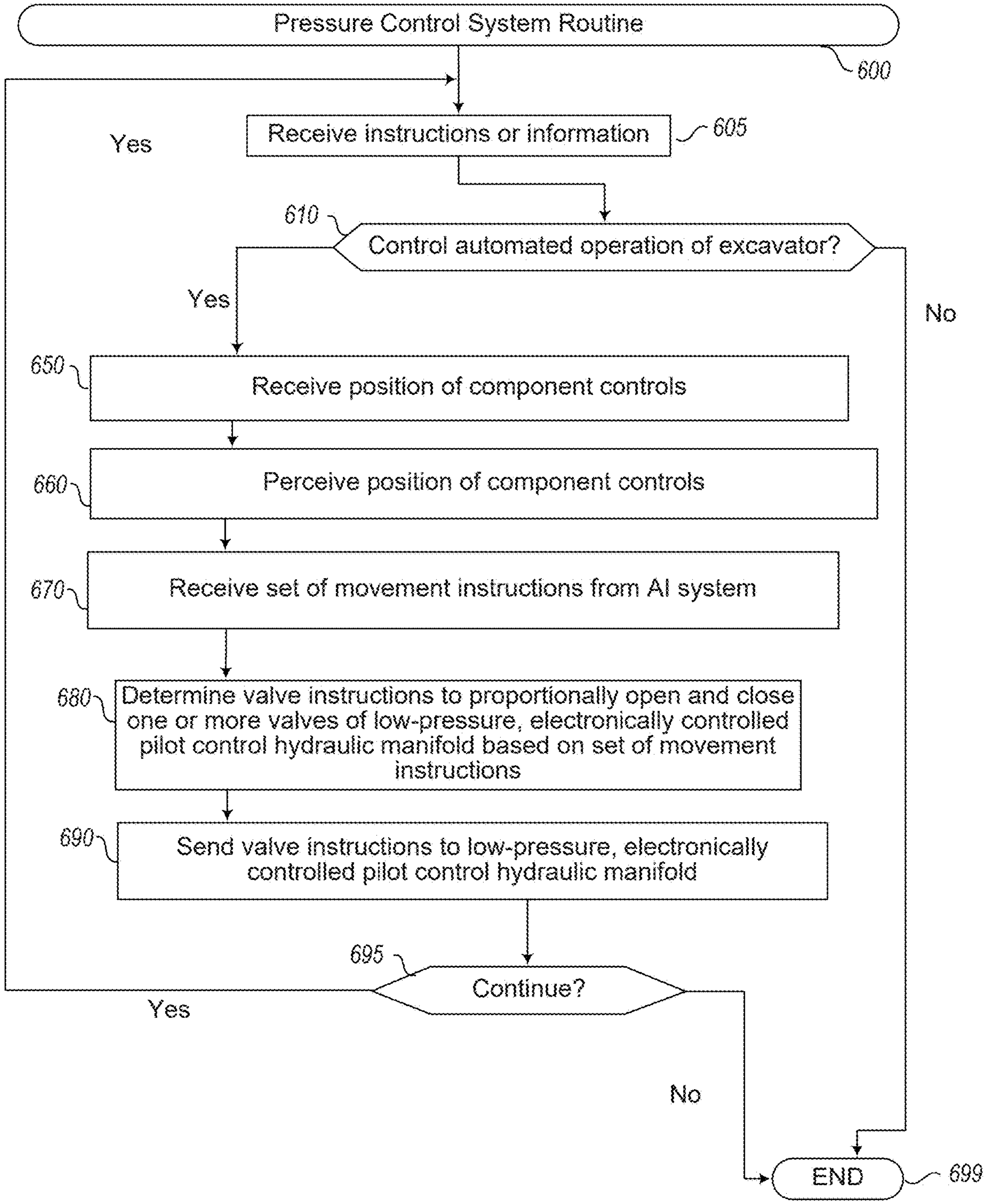
FIG. 6 is an example flow diagram of an illustrated embodiment of a proportional pressure control system.

FIG. 6 is an example flow diagram of an illustrated embodiment of a proportional pressure control system routine 600. The routine may be provided by, for example, execution of an embodiment of the VCS 102 of FIG. 1 and as discussed elsewhere herein, such as to perform automated operations for proportional pressure control of one or more vehicle components to implement autonomous control of earth-moving construction and/or mining vehicles using the described hardware component architecture, including in some embodiments by a VCS 102 attached to (e.g., mounted on) and executing on an excavator vehicle or other earth-moving vehicle being controlled (e.g., without interacting with any other computing devices or systems remote from the vehicle, other than to receive transmissions such as GPS signals and RTK correction data). While routine 600 is discussed with respect to controlling operations of a single earth-moving vehicle at a time, it will be appreciated that the routine 600 may be performed in other manners in other embodiments, including to control operations of multiple earth-moving vehicles of one or more types on a job site, to be implemented by one or more configured devices or systems (optionally in multiple locations and/or operating in a distributed or otherwise coordinated manner, such as with a computing device local to a vehicle performing some of the automated operations while one or more remote server systems in communication with that computing device perform additional portions of the routine), etc.

The routine 600 begins in block 605, where instructions or information is received (e.g., waiting at block 605 until such instructions or information is received). The routine continues to block 610 to determine whether to perform automated operations to autonomously control an earth-moving vehicle (e.g., based on receiving an instruction to do so, etc.). In block 650, the routine then receives one or more positions of one or more component controls 104, such as joystick(s) 106, pedal(s) 108, and/or button(s) 109. These positions of the component controls indicate any manual movement that has occurred on the component controls 104, which would indicate to halt autonomous control, as well as the previous positions of the component controls 104 compared to current positions of the component controls 104. These positions may be sampled at various sample periods as needed. At block 660, the VCS 102 may perceive the position of the component controls 104. For example, the VCS 102 may perceive positions of one or more of a first joystick 106, a second joystick 106, a first pedal 108, a second pedal 108, and/or a button 109. The VCS 102 may then feed the perceived positions of the component controls 104 to the AI system 130. The AI system 130 may then analyze the component controls 104, along with sensor data 121, position information 123, location information 125, vehicle information 128, and/or environment information 129 as needed to determine a set of movement instructions as described elsewhere herein. In some embodiments, the movement instructions may include one or more of a speed and/or a position of a next movement of the component controls 104, such as a joystick 106, pedal 108, and/or button 109.

At block 670, the VCS 102 receives the set of movement instructions from the AI system 130. The VCS 102 may then determine valve instructions to proportionally open and close one or more valves of low-pressure, electronic pilot control manifold 145 based on the set of movement instructions. For example, the VCS 102 may determine a position to move a first joystick to control movement of a bucket joint and a command to empty the bucket at a specific speed from the set of commands. The VCS 102 may determine which valves of the pilot control manifold 145 to partially open and a speed at which to partially open those valves in order to effect the commands. At block 680, the VCS 102 may then send the valve instructions to the low-pressure electronical pilot control manifold 145 (e.g., the pilot control manifold 145) to open one or more of the valves as the valve instructions indicate. The low-pressure electronically controlled pilot control manifold 145 may than open the specific valves from the valve instructions, causing the main hydraulic manifold 150 to allow proportional pressure in the lines to control the components, such as the bucket joint from the above example based on the specific valves from the pilot control manifold 145. After 690, the routine continues to block 695 to determine whether to continue, such as until an explicit indication to terminate is received, or instead only if an explicit indication to continue is received. If it is determined to continue, the routine returns to block 605, and otherwise continues to block 699 and ends. In addition, if it is instead determined in block 610 that the information or instructions received in block 605 are not to control automated operation of the excavator vehicle(s), the routine continues instead to block 699 and ends.

Figure 7A:
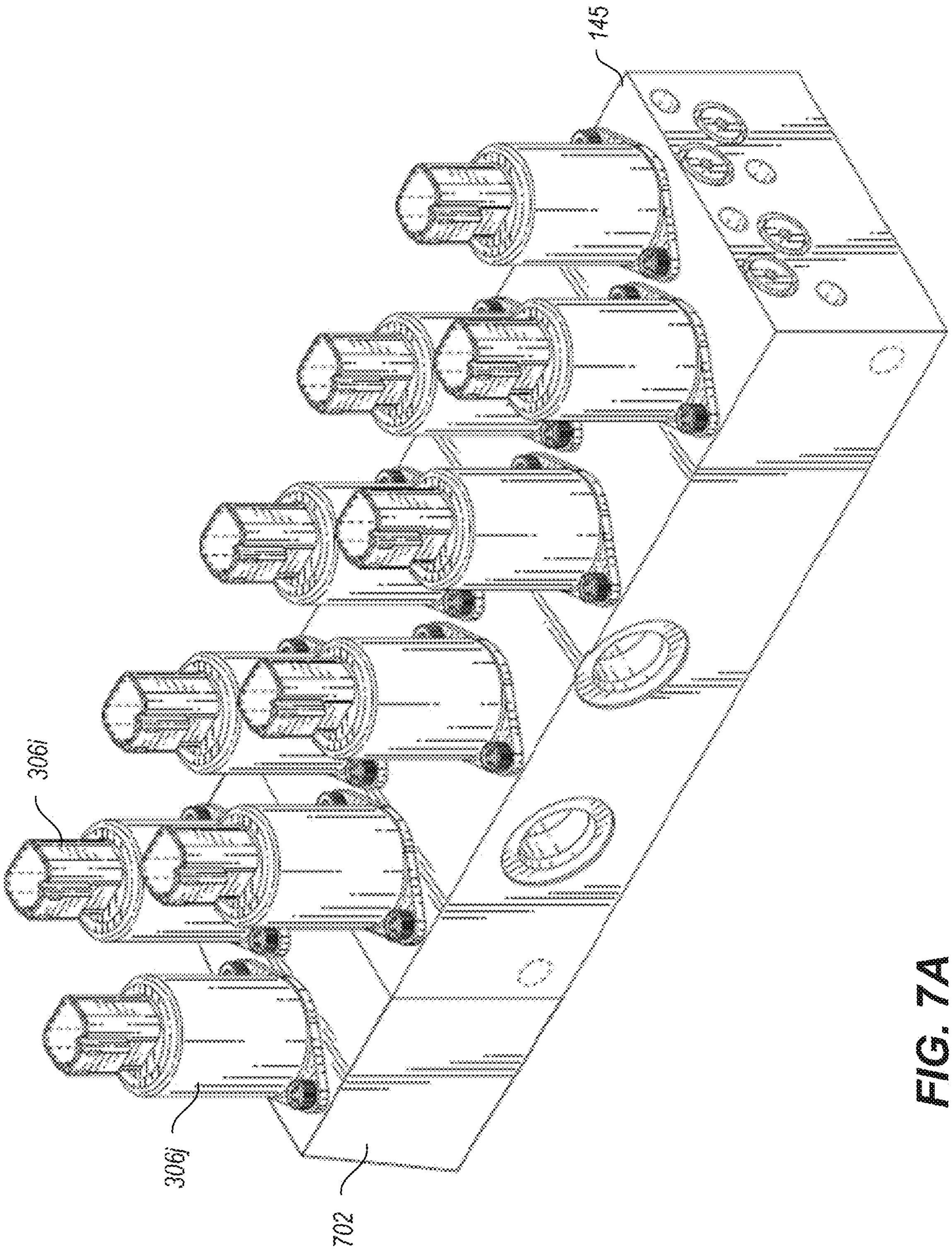
FIGS. 7A-7C illustrate an example expansion manifold for use in controlling components of an earth-moving construction and/or mining vehicle.
Figure 7B:
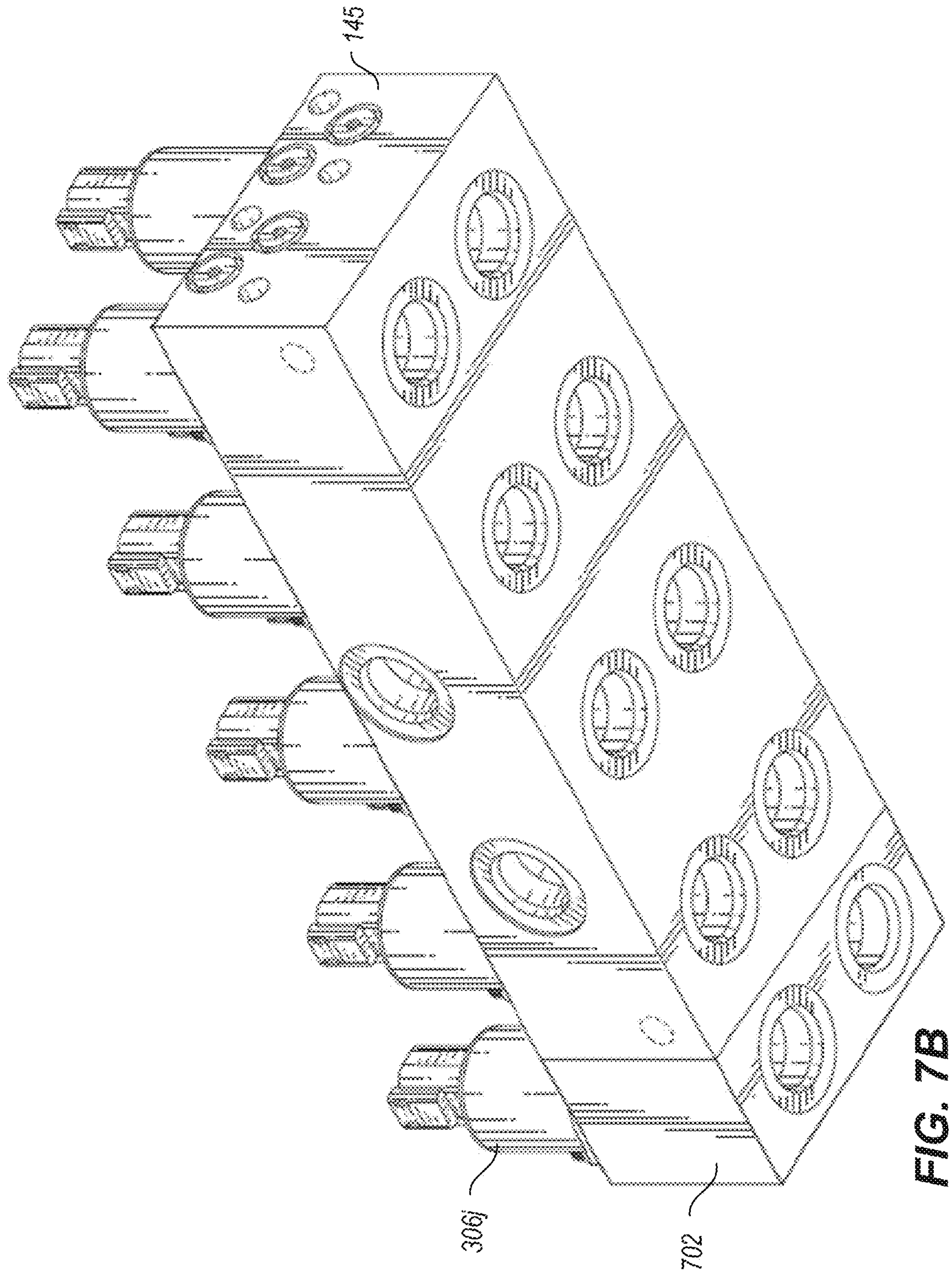
Figure 7C:
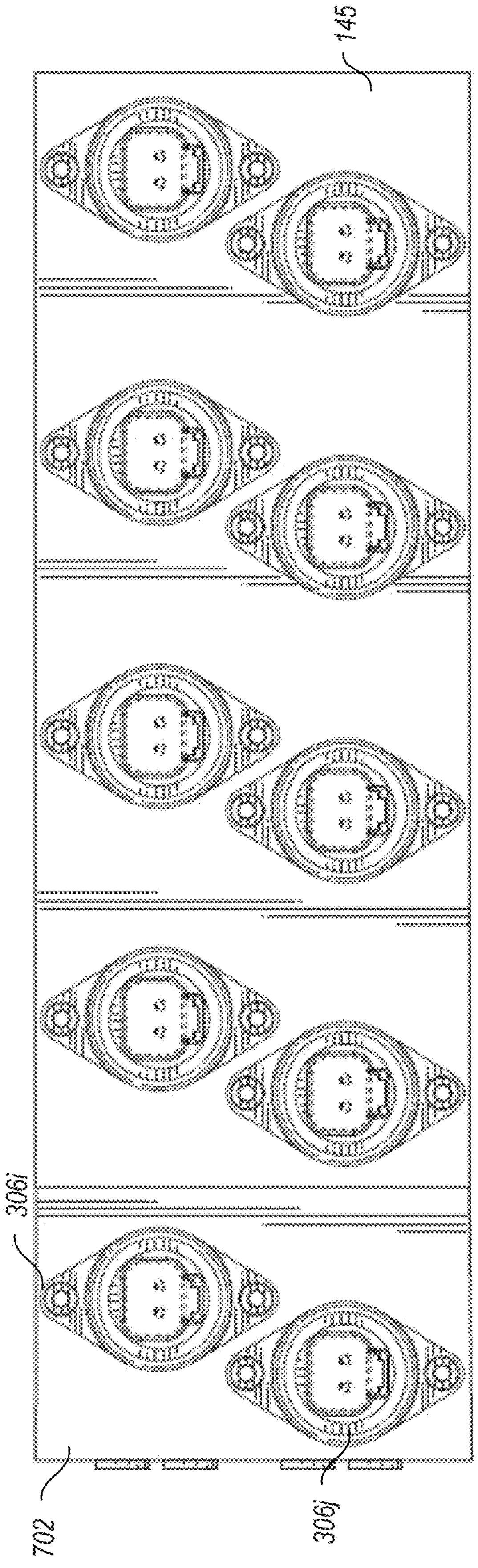
Figure 8A:
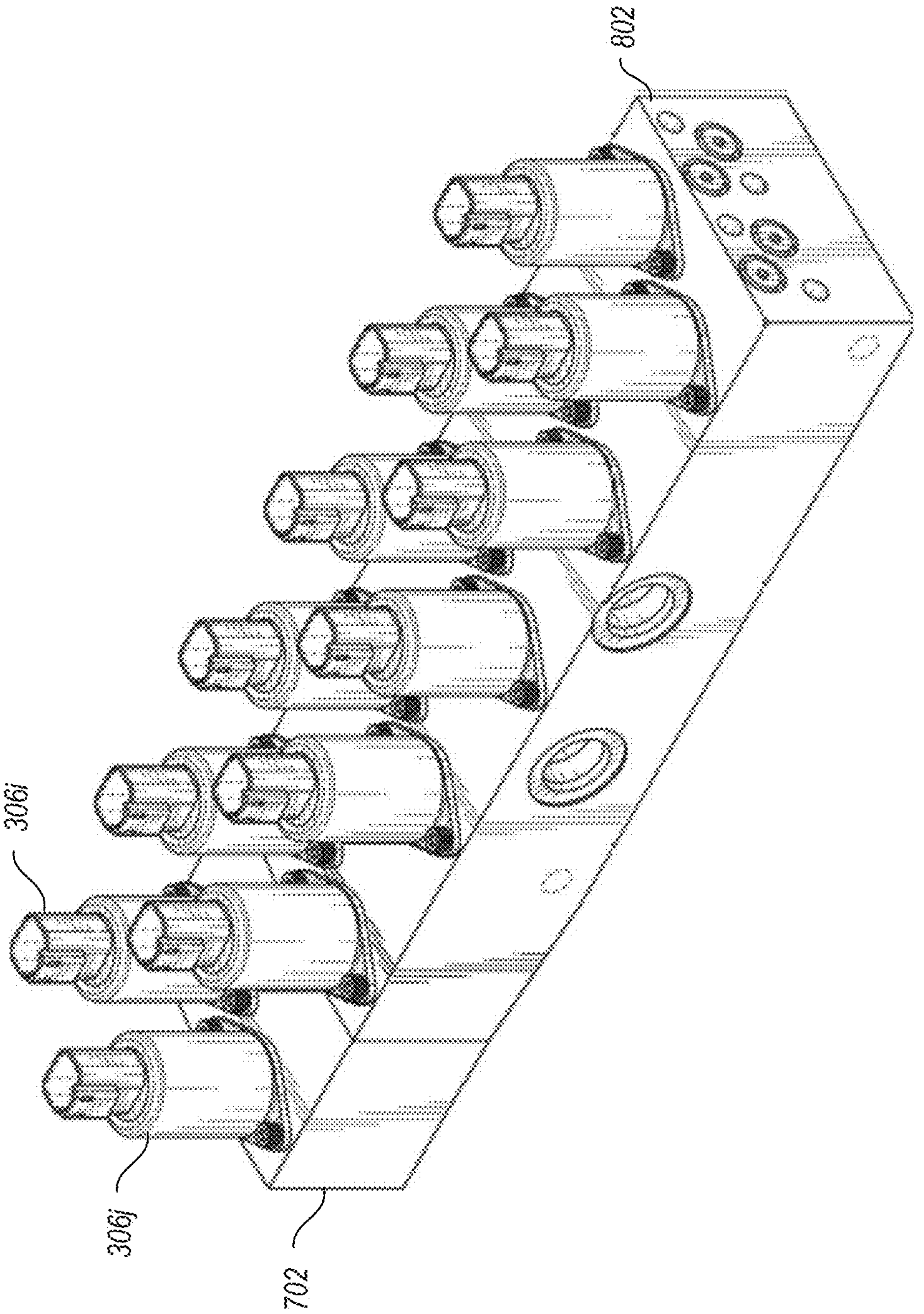
FIGS. 8A-8C illustrate an example expansion manifold for use in controlling components of an earth-moving construction and/or mining vehicle.
Figure 8B:
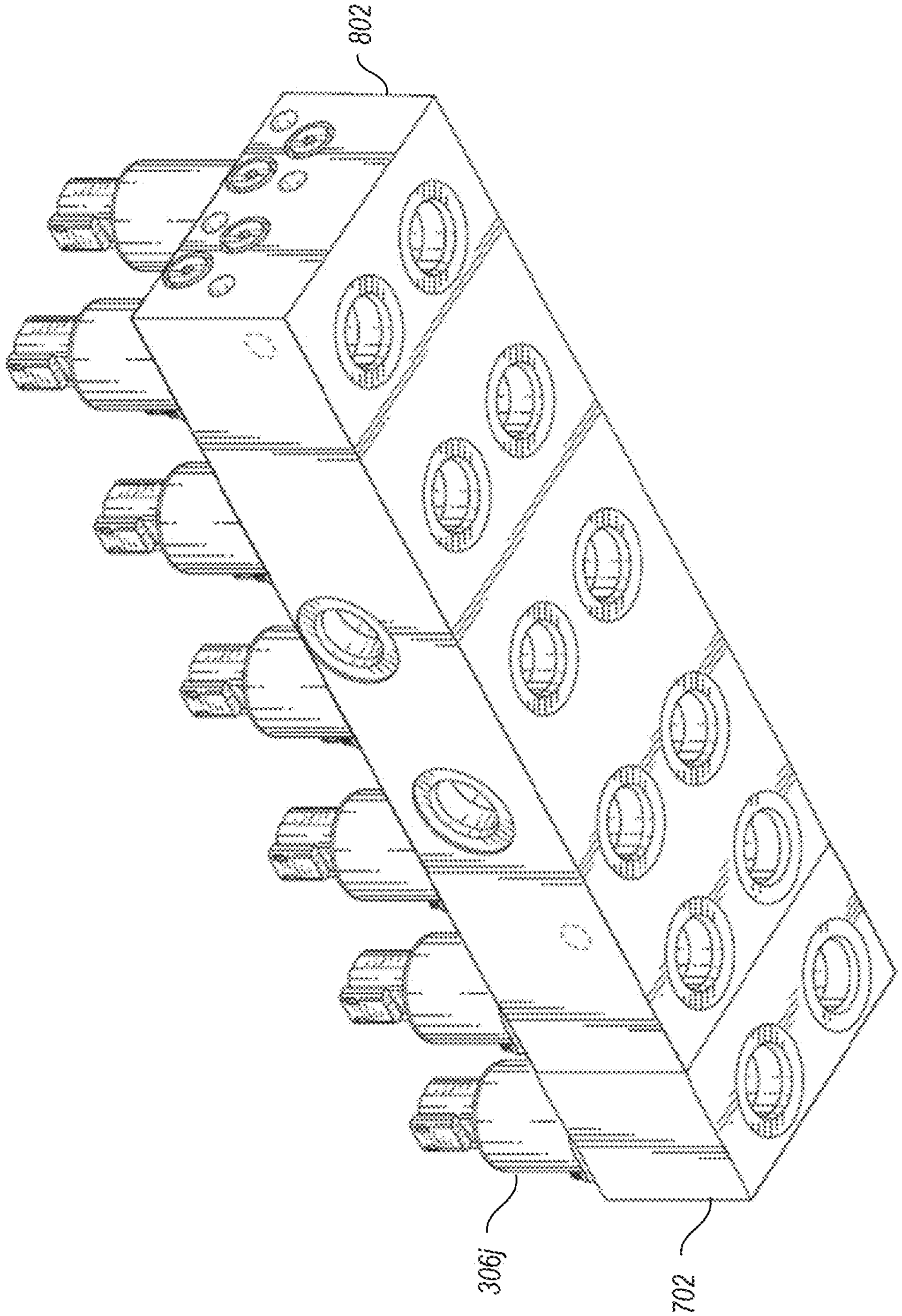
Figure 8C:
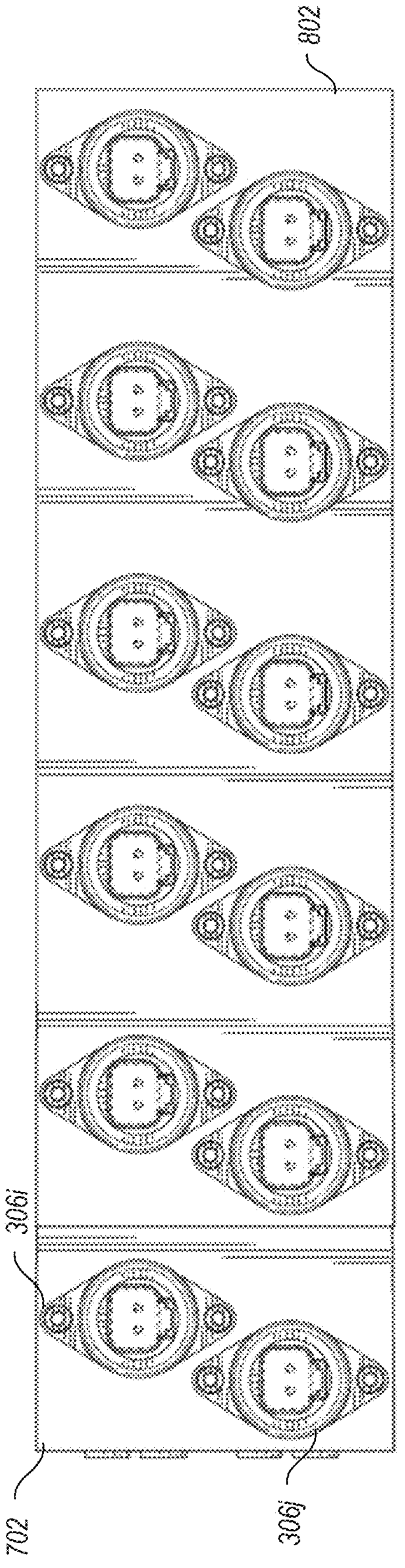

FIGS. 7A-7C illustrates an example of an extension manifold 702 with additional valves 306. As shown in FIG. 7A, a two-valve extension manifold 702 is shown that can be connected using the extension ports 312 to a pilot control manifold 145 in order to increase the valves 306 in a system. Using the pilot control manifold 145 and the extension manifold 702 any number of valve configurations and layouts can be contemplated based on the number of components 170 on an earth-moving vehicle 200. As shown in FIG. 7B, the extension manifold 702 may attach to the internal channels 308 using the extension ports 312 and allow the valves 306*i* and 306*j* of the extension manifold 702 to share the same low-pressure as the pilot control manifold 145 without additional setup and configurations. FIG. 7C shows a top-down view of an extension manifold 702 in a rectangular configuration, although it should be understood that any number of shapes and configurations of extension manifolds 702 are contemplated. For example, it should be understood that while the extension manifold 702 is shown as being substantially rectangular in shape, other sizes, shapes, and configurations are contemplated to increase the number of valves as well as the space in which the pilot control manifold 145 and the extension manifold 702 are positioned. For example, while a two valve extension manifold 702 is shown in FIGS. 7A-7C, additional valve groupings are also contemplated, such as a four valve extension, a single valve extension, a six valve extension, etc. Additionally, FIGS. 8A-8C illustrate an example of an extension manifold 702 with additional valves 306 connected to an eight-valve pilot control manifold 802. It should be understood that the example eight-valve pilot control manifold 802 is similar to the pilot control manifold 145 described herein, however, the example embodiment of the eight-valve pilot control manifold 802 is a specific implementation of the pilot control manifold 145 with an eight-valve configuration. As shown in FIG. 8A, the eight-valve pilot control manifold 802 can connect to a extension manifold 702 with additional valves 306. FIGS. 8B and 8C illustrate additional views of one embodiment of an eight-valve pilot control manifold 802.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A method of autonomously controlling an earth-moving vehicle comprising:

receiving a set of autonomous movement instructions for an earth-moving vehicle from a vehicle control system for the earth-moving vehicle that replace one or more operator manipulations of one or more component controls, the set of autonomous movement instructions being autonomously determined using an AI component based on one or more perceived positions of at least one of the one or more component controls and the set of autonomous movement instructions are to be implemented for use in autonomously controlling one or more moveable parts of the earth-moving vehicle to accomplish a target task; and implementing the autonomous movement instructions on the earth-moving vehicle using a low-pressure, electronically controlled hydraulic manifold on the earth-moving vehicle that is operably connected to a main hydraulic manifold associated with the one or more moveable parts of the earth-moving vehicle.

2. The method of claim 1 wherein the using of the low-pressure, electronically controlled hydraulic manifold for the implementing of the movement instructions on the earth-moving vehicle includes, for each of at least one valve of a plurality of valves each associated with a component control on the earth-moving vehicle, performing at least one of a proportional opening of the at least one valve and a proportional closing of the at least one valve.

3. The method of claim 2 wherein each of the plurality of valves represents a direction corresponding to a position of at least one of a joystick component control on the earth-moving vehicle, a pedal component control on the earth-moving vehicle, and a button component control on the earth-moving vehicle.

4. The method of claim 3 wherein the receiving of the set of movement instructions for the earth-moving vehicle is based at least in part on information about current settings for the one or more component controls of the earth-moving vehicle from the one or more operator manipulations.

5. The method of claim 4 wherein the one or more component controls include a first joystick for controlling movement of a first arm joint and a third arm joint of the earth-moving vehicle, a button mounted on the first joystick for controlling movement of a tool of the earth-moving vehicle, and a second joystick for controlling movement of a second arm joint and a cabin rotation of the earth-moving vehicle.

6. The method of claim 2 wherein the one or more moveable parts of the earth-moving vehicle include at least one of an arm of the earth-moving vehicle or an attachment of the earth-moving vehicle.

7. The method of claim 6 wherein performing at least one of a proportional opening of the at least one valve and a proportional closing of the at least one valve causes the at least one of an arm of the earth-moving vehicle and an attachment of the earth-moving vehicle to move based on the proportional opening.

8. The method of claim 1 wherein the set of movement instructions received from the vehicle control system are used in place of the one or more operator manipulations of the one or more components controls, the one or more operator manipulations each including an operator of the earth-moving vehicle manually moving one of the component controls that is associated with at least one of the one or more moveable parts of the earth-moving vehicle.

9. The method of claim 8 wherein the earth-moving vehicle is an excavator vehicle and the one or more moveable parts of the earth-moving vehicle include a boom and a bucket.

10. A proportional pressure control system for autonomous excavation comprising:

a component control for controlling movement of a component of an earth-moving vehicle;

a low-pressure electronically controlled pilot control manifold for controlling movement of a plurality of valves, each valve representing a direction corresponding to a position of the component control;

a vehicle control system using an AI component that is configured to autonomously determine a movement instruction to implement a next movement of the component of the earth-moving vehicle as part of using the component of the earth-moving vehicle to perform an autonomously determined target task;

a microcontroller electronically connected to the component control, the low-pressure electronically controlled pilot control manifold, and the vehicle control system, the microcontroller configured to:

perceive the position of the component control;

provide the position of the component control;

receive autonomous movement instructions from the vehicle control system that replace inputs of the component controls and that are for use in autonomously controlling the component of the earth-moving vehicle to accomplish the target task, wherein the autonomous movement instructions are based on the perceived position of the component control; and effect a proportional openings of one or more valves of the plurality of valves based on the autonomous movement instructions; and a main hydraulic manifold connected to the low-pressure electronically controlled pilot control manifold, wherein the main hydraulic manifold effects movement of the component of the earth-moving vehicle corresponding to the proportional opening of the one or more valves of the plurality of valves of the low-pressure electronically controlled pilot control manifold.

11. The proportional pressure control system of claim 10 wherein the component control is one of a joystick, a pedal, and a button.

12. The proportional pressure control system of claim 11, wherein the movement instructions from the vehicle control system mimic a manual movement of the one of the joystick, the pedal, and the button by an operator.

13. The proportional pressure control system of claim 10, wherein the low-pressure electronically controlled pilot control manifold is used to control instructions to the main hydraulic manifold in place of the component control.

14. The proportional pressure control system of claim 10, wherein the low-pressure electronically controlled pilot control manifold operates at a pressure of 55 Bars.

15. The proportional pressure control system of claim 10, wherein the low-pressure electronically controlled pilot control manifold is mounted outside of a cabin of the earth-moving vehicle.

16. The proportional pressure control system of claim 10, further comprising an extension manifold connected to the low-pressure electronically controlled pilot control manifold and including a plurality of additional valves that rely on a pressure system of the low-pressure electronically controlled pilot control manifold, each additional valve of the plurality of additional valves representing a direction corresponding to a position of an additional component of the earth-moving vehicle.

17. A proportional pressure control system for autonomous excavation, comprising:

a first joystick for controlling movement of a first arm joint and a third arm joint of an excavator vehicle;

a button mounted on the first joystick for controlling movement of a tool of the excavator vehicle;

a second joystick for controlling movement of a second arm joint and a cabin rotation of the excavator vehicle;

a first pedal for controlling forward and backward movement of right track of the excavator vehicle;

a second pedal for controlling forward and backward movement of a left track of the excavator vehicle;

a low-pressure, electronically controlled pilot control manifold for controlling movement of a plurality of valves, each valve representing a direction corresponding to a position of one or more of the first joystick, the second joystick, the first pedal, the second pedal, and the button;

a vehicle control system using an AI component that is configured to autonomously determine speed and position of one or more of a next movement of the first joystick, the second joystick, the first pedal, the second pedal, and the button to perform an autonomously determined target task;

a microcontroller electrically connected to the first joystick, the second joystick, the first pedal, the second pedal, the button, the low-pressure, electronically controlled pilot control manifold, and the vehicle control system, the microcontroller configured to:

perceive the positions of one or more of the first joystick, the second joystick, the first pedal, the second pedal, and the button;

feed the positions of the one or more of the first joystick, the second joystick, the first pedal, the second pedal, and the button to the vehicle control system;

receive a set of autonomous movement instructions from the vehicle control system, that replace inputs of the one or more of the first joystick, the second joystick, the first pedal, the second pedal, and the button and that are for use in autonomously controlling the excavator vehicle to accomplish the target task, wherein the autonomous movement instructions are based on the perceived positions of the one or more of the first joystick, the second joystick, the first pedal, the second pedal, and the button; and effect proportional opening and closing of one or more of the valves of the plurality of valves of the low-pressure, electronically controlled pilot control manifold based on the set of autonomous movement instructions; and a main hydraulic manifold connected to the low-pressure, electronically controlled pilot control manifold, wherein the main hydraulic manifold effects movement of one or more of the first arm joint, the second arm joint, the third arm joint, the cabin rotation, the right track, the left track, and the tool, corresponding to the proportional opening and closing of the one or more valves of the plurality of valves of the low-pressure, electronically controlled pilot control manifold.

18. The proportional pressure control system of claim 17 further comprising a plurality of inclinometers for measuring angular positions of a boom, a stick, a bucket, a pitch and a roll of a cabin, and the tool of the excavator vehicle relative to ground.

19. The proportional pressure control system of claim 17, wherein the first joystick further controls a movement of a bucket joint.

20. The proportional pressure control system of claim 8, wherein the low-pressure, electronically controlled pilot control manifold has eight valves forming the plurality of valves.

* * * * *